United States Patent
Gou et al.

(10) Patent No.: US 12,395,278 B2
(45) Date of Patent: Aug. 19, 2025

(54) HARQ-ACK CODEBOOK GENERATION METHOD, HARQ-ACK CODEBOOK TRANSMISSION METHOD, AND PDSCH RECEPTION METHOD

(71) Applicant: ZTE Corporation, Shenzhen (CN)

(72) Inventors: Wei Gou, Shenzhen (CN); Peng Hao, Shenzhen (CN); Xianghui Han, Shenzhen (CN); Junfeng Zhang, Shenzhen (CN); Wei Chen, Shenzhen (CN); Min Ren, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 430 days.

(21) Appl. No.: 17/917,284

(22) PCT Filed: Jan. 13, 2021

(86) PCT No.: PCT/CN2021/071471
§ 371 (c)(1),
(2) Date: Oct. 6, 2022

(87) PCT Pub. No.: WO2021/203790
PCT Pub. Date: Oct. 14, 2021

(65) Prior Publication Data
US 2023/0198677 A1   Jun. 22, 2023

(30) Foreign Application Priority Data
Apr. 10, 2020   (CN) .................. 202010284591.5

(51) Int. Cl.
*H04L 1/1812* (2023.01)
*H04W 72/11* (2023.01)
(Continued)

(52) U.S. Cl.
CPC ........... *H04L 1/1812* (2013.01); *H04W 72/11* (2023.01); *H04W 72/1268* (2013.01); *H04W 72/1273* (2013.01); *H04W 72/566* (2023.01)

(58) Field of Classification Search
CPC ... H04L 1/1812; H04L 5/0055; H04L 1/1607; H04L 1/1671; H04L 1/1829;
(Continued)

(56) References Cited

U.S. PATENT DOCUMENTS

| | | | | |
|---|---|---|---|---|
| 2010/0165939 A1* | 7/2010 | Lin | ........................ | H04L 1/1854 370/329 |
| 2011/0116457 A1* | 5/2011 | Damnjanovic | ....... | H04L 1/1854 370/329 |

(Continued)

FOREIGN PATENT DOCUMENTS

| | | |
|---|---|---|
| CN | 102075313 A | 5/2011 |
| CN | 109586877 A | 4/2019 |

(Continued)

OTHER PUBLICATIONS

U.S. Appl. No. 62/937,057 (Year: 2019).*
(Continued)

*Primary Examiner* — Rushil P. Sampat
(74) *Attorney, Agent, or Firm* — CANTOR COLBURN LLP

(57) ABSTRACT

Provided are an HARQ-ACK codebook generation method, an HARQ-ACK codebook transmission method, and a PDSCH reception method. The HARQ-ACK codebook generation method includes: receiving UL grant information sent by a base station, wherein a PUSCH scheduled by the UL grant information is used for the UE to transmit an HARQ-ACK codebook; and according to a value of a Downlink Assignment index (DAI) in the UL grant information and a situation that the UE receives PDSCHs,
(Continued)

```
┌─────────────────────────────────────────────────────────────┐
│  Receive UL grant information sent by a base station, herein a PUSCH   │  S102
│  scheduled by the UL grant information is used for the UE to transmit an │
│                        HARQ-ACK codebook                                │
└─────────────────────────────────────────────────────────────┘
                                  │
                                  ▼
┌─────────────────────────────────────────────────────────────┐
│  Determine, according to a value of a DAI in the UL grant information and a │ S104
│  situation that the UE receives PDSCHs, a corresponding mechanism to generate │
│                       the HARQ-ACK codebook                             │
└─────────────────────────────────────────────────────────────┘
``` determining a corresponding mechanism to generate the HARQ-ACK codebook.

12 Claims, 4 Drawing Sheets

(51) Int. Cl.
*H04W 72/1268* (2023.01)
*H04W 72/1273* (2023.01)
*H04W 72/566* (2023.01)

(58) Field of Classification Search
CPC ... H04L 1/1861; H04W 72/11; H04W 72/566; H04W 72/1268; H04W 72/1273; H04W 28/06; H04W 72/0446; H04W 72/23
See application file for complete search history.

(56) References Cited

U.S. PATENT DOCUMENTS

| | | | | |
|---|---|---|---|---|
| 2014/0078981 | A1* | 3/2014 | Larsson | H04L 1/1607 370/329 |
| 2015/0146643 | A1* | 5/2015 | Fu | H04L 1/1812 370/329 |
| 2017/0134140 | A1 | 5/2017 | Park | |
| 2018/0278373 | A1* | 9/2018 | Wang | H04L 5/0055 |
| 2020/0296695 | A1* | 9/2020 | Gao | H04L 1/1664 |
| 2021/0153237 | A1* | 5/2021 | Saber | H04L 1/188 |
| 2022/0239445 | A1* | 7/2022 | Yoshioka | H04W 72/23 |

FOREIGN PATENT DOCUMENTS

| | | |
|---|---|---|
| CN | 109842477 A | 6/2019 |
| CN | 110662304 A | 1/2020 |
| CN | 110740019 A | 1/2020 |
| CN | 111884770 A | 11/2020 |
| WO | 2016041203 A1 | 3/2016 |
| WO | 2017127974 A1 | 8/2017 |
| WO | 2019172624 A1 | 9/2019 |
| WO | 2020057566 A1 | 3/2020 |

OTHER PUBLICATIONS

WO 2020/225917 A1 (Year: 2020).*
International Search Report for corresponding application PCT/CN2021/071471 filed on Jan. 13, 2021; Report dated Apr. 19, 2021.
Wilus Inc, "Remaining issues on UCI enhancement for NR URLLC", 3GPP TSG RAN WGl #100, e-Meeting, Feb. 24-Mar. 6, 2020, R1-2000936.

* cited by examiner

Fig. 4

Send UL grant information to a UE, and determine a mechanism for the UE to generate the HARQ-ACK codebook by setting a value of a DAI in the UL grant information and indicating a situation of PDSCHs corresponding to HARQ-ACKs in the HARQ-ACK codebook, herein a PUSCH scheduled by the UL grant information is used for the UE to transmit the HARQ-ACK codebook — S202

Fig. 5

Transmit a first PUCCH and/or a second PUCCH in a same slot according to a preset mode, herein the first PUCCH is a PUCCH corresponding to a first HARQ-ACK codebook, the second PUCCH is a PUCCH corresponding to a second HARQ-ACK codebook, and the first PUCCH and the second PUCCH do not overlap in a time domain — S302

Fig. 6

In a case where at least one DS PDSCH scheduled by a base station and at least one SPS PDSCH configured by the base station overlap in a time domain, at least discard at least one first SPS PDSCH, and receive at least one target SPS PDSCH and the at least one DS PDSCH, herein the at least one first SPS PDSCH is one or more SPS PDSCHs, that overlap the at least one DS PDSCH in the time domain, in the at least one SPS PDSCH — S402

Fig. 7

Group at least one DS PDSCH and at least one SPS PDSCH according to a preset priority to obtain at least one PDSCH set, herein each PDSCH set includes at least one DS PDSCH and/or at least one SPS PDSCH — S502

In each PDSCH set, determine a DS PDSCH to be received and/or an SPS PDSCH to be received in the PDSCH set according to a preset mode — S504

:(1)

HARQ-ACK CODEBOOK GENERATION METHOD, HARQ-ACK CODEBOOK TRANSMISSION METHOD, AND PDSCH RECEPTION METHOD

CROSS-REFERENCE TO RELATED APPLICATION

The present disclosure is a National Stage Filing of PCT International Application PCT/CN2021/071471 filed on Jan. 13, 2021, which is based upon and claims priority to Chinese Patent Application No. 202010284591.5, filed to the China National Intellectual Property Administration on Apr. 10, 2020, the disclosure of which is incorporated herein by reference in its entirety.

TECHNICAL FIELD

The present disclosure relates to the field of communication, for example, to a Hybrid Automatic Repeat ReQuest Acknowledgement (HARQ-ACK) codebook generation method, an HARQ-ACK codebook transmission method, and a Physical Downlink Shared Channel (PDSCH) reception method.

BACKGROUND

In a related art, an HARQ-ACK codebook refers to an HARQ-ACK feedback sequence generated for downlink transmission of HARQ-ACK feedback performed at the same time domain location or uplink channel. Generally speaking, there are two different generation mechanisms for the HARQ-ACK codebook.

If User Equipment (UE) only receives multiple Semi Persistent Scheduling Physical Downlink Shared Channels (SPS PDSCHs), and the abovementioned SPS PDSCHs do not have corresponding Physical Downlink Control Channel (PDCCH) scheduling, then in a process of generating the corresponding HARQ-ACK codebooks only for these SPS PDSCHs (that is, there is no HARQ-ACK of a Dynamic Scheduling PDSCH (DS PDSCH) and/or HARQ-ACK of SPS PDSCH release in the HARQ-ACK codebooks) and reporting the HARQ-ACK codebooks to a base station, the bit order in the HARQ-ACK codebooks is as follows: first ascending according to the index of a serving cell, then ascending according to an SPS index in the serving cell, and then ascending according to a downlink slot of each SPS index in the serving cell. As long as the abovementioned SPS PDSCH meets the configuration for the UE, it is necessary to generate an HARQ-ACK for the SPS PDSCH when the HARQ-ACK codebook is generated regardless of whether the SPS PDSCH is actually transmitted.

FIG. 1 is a schematic diagram of component carriers provided according to a related art, as shown in FIG. 1, the Component Carriers (CC) include CC 1 and CC2. An SPS index 1 and an SPS index 2 are configured in CC1, and SPS index 3 and an SPS index 4 are configured in CC2. The obtained HARQ-ACK codebook is that: first, first HARQ-ACKs corresponding to the SPS PDSCHs in the SPS index 1 in CC1 are generated according to a downlink slot ascending order, that is, SPS1 in slot n and HARQ-ACKs of SPS1 in slot n+1; then, second HARQ-ACKs corresponding to the SPS PDSCHs in the SPS index 2 in CC1 are generated according to the downlink slot ascending order, that is, SPS2 in slot n and HARQ-ACKs of SPS2 in slot n+1; then, third HARQ-ACKs corresponding to the SPS PDSCHs in the SPS index 3 in CC2 are generated according to a downlink slot ascending order, that is, SPS3 in slot n and HARQ-ACKs of SPS3 in slot n+1; and then, fourth HARQ-ACKs corresponding to the SPS PDSCHs in the SPS index 4 in CC2 are generated according to a downlink slot ascending order, that is, SPS4 in slot n and HARQ-ACKs of SPS4 in slot n+1. Then, the first HARQ-ACKs, the second HARQ-ACKs, the third HARQ-ACKs, and the fourth HARQ-ACKs are concatenated in sequence, so as to obtain a final HARQ-ACK codebook of these SPS PDSCHs. The abovementioned mode for generating the HARQ-ACK codebook may be referred to as an SPS codebook mechanism.

In addition to the above mechanism, in the related art, when a semi persistent HARQ-ACK codebook is generated for the Dynamic Scheduling (DS) PDSCHs (referred to as DS PDSCHs hereinafter) or the SPS release, the used mechanism is that: a corresponding HARQ-ACK codebook is generated according to a candidate PDSCH Time Domain Resource Allocation (TDRA) table. The abovementioned mode for generating the HARQ-ACK codebook may be referred to as a TDRA Table codebook mechanism.

In addition, according to the provisions in the related art, once the HARQ-ACK of the SPS PDSCH and the HARQ-ACK of the DS PDSCH (and/or SPS release) are multiplexed in one HARQ-ACK codebook, the TDRA Table codebook mechanism needs to be used to generate the HARQ-ACK codebook.

In the related art, a base station may transmit at least one SPS PDSCH and schedule at least one DS PDSCH for a UE, and indicate that the HARQ-ACKs of these SPS PDSCHs and DS PDSCHs are multiplexed in one HARQ-ACK codebook. However, during reception at the UE side, it is possible that only multiple SPS PDSCHs is received and no DS PDSCH is received due to missed detection of the UE and the like. For example, when there is only one or few DS PDSCHs, the abovementioned case is more likely to occur, resulting in that the UE side actually receives only at least one SPS PDSCH. In the abovementioned case, the UE will generate the HARQ-ACK codebook according to the SPS codebook mechanism and feed back the HARQ-ACK codebook. However, the base station side considers that the HARQ-ACK codebook is generated by the UE according to the TDRA table codebook mechanism, which results in inconsistent understanding of the generation mechanism of the HARQ-ACK codebook between the base station and the UE. The bit orders of the HARQ-ACK codebooks actually generated in the abovementioned two modes and the sizes of the finally obtained HARQ-ACK codebooks are different, which will result in that the base station cannot correctly receive the HARQ-ACK codebook of the UE.

SUMMARY

Embodiments of the present disclosure provides an HARQ-ACK codebook generation method, an HARQ-ACK codebook transmission method, and a PDSCH reception method, which can at least solve the problem that a base station cannot effectively receive an HARQ-ACK codebook fed back by UE in a related art.

According to an embodiment of the present disclosure, an HARQ-ACK codebook generation method is provided, which is applied to a UE and includes the following operations.

Uplink (UL) grant information sent by a base station is received. A Physical Uplink Shared Channel (PUSCH) scheduled by the UL grant information is used for the UE to transmit an HARQ-ACK codebook. According to a value of a Downlink Assignment Index (DAI) in the UL grant information and a situation that the UE receives PDSCHs, a corresponding mechanism is determined to generate the HARQ-ACK codebook.

According to another embodiment of the present disclosure, an HARQ-ACK codebook generation method is further provided, which is applied to a base station and includes the following operations.

UL grant information is sent to a UE, and a mechanism for the UE to generate the HARQ-ACK codebook is determined by setting a value of a DAI in the UL grant information and indicating a situation of PDSCHs corresponding to HARQ-ACKs in the HARQ-ACK codebook. A PUSCH scheduled by the UL grant information is used for the UE to transmit the HARQ-ACK codebook.

According to another embodiment of the present disclosure, an HARQ-ACK codebook transmission method is further provided, which is applied to a UE and includes the following operations.

A first Physical Uplink Control Channel (PUCCH) and/or a second PUCCH are transmitted in a same slot according to a preset mode. The first PUCCH is a PUCCH corresponding to a first HARQ-ACK codebook, the second PUCCH is a PUCCH corresponding to a second HARQ-ACK codebook, and the first PUCCH and the second PUCCH do not overlap in a time domain.

According to another embodiment of the present disclosure, a PDSCH reception method is further provided, which is applied to a UE and includes the following operations.

In a case where at least one DS PDSCH scheduled by a base station and at least one SPS PDSCH configured by the base station overlap in a time domain, at least one first SPS PDSCH is discarded, and at least one target SPS PDSCH and the at least one DS PDSCH are received. The at least one first SPS PDSCH is one or more SPS PDSCHs, that overlap the at least one DS PDSCH in the time domain, in the at least one SPS PDSCH.

According to another embodiment of the present disclosure, a PDSCH reception method is further provided, which is applied to a UE and include the following operations.

At least one DS PDSCH and at least one SPS PDSCH are grouped so as to obtain at least one PDSCH set according to a preset priority. Each PDSCH set includes at least one DS PDSCH, and/or at least one SPS PDSCH. In each PDSCH set, a DS PDSCH to be received and/or an SPS PDSCH to be received in the PDSCH set are determined according to a preset mode.

According to another embodiment of the present disclosure, an HARQ-ACK codebook generation apparatus is further provided, which is applied to a UE and includes a first receiving module and a generating module.

The first receiving module is configured to receive UL grant information sent by a base station. A PUSCH scheduled by the UL grant information is used for the UE to transmit an HARQ-ACK codebook. The generating module is configured to determine, according to a value of a DAI in the UL grant information and a situation that the UE receives PDSCHs, a corresponding mechanism to generate the HARQ-ACK codebook.

According to another embodiment of the present disclosure, an HARQ-ACK codebook generation apparatus is further provided, which is applied to a base station and includes a sending module.

The sending module is configured to send UL grant information to a UE, and determine a mechanism for the UE to generate the HARQ-ACK codebook by setting a value of a DAI in the UL grant information and indicating a situation of PDSCHs corresponding to HARQ-ACKs in the HARQ-ACK codebook. A PUSCH scheduled by the UL grant information is used for the UE to transmit the HARQ-ACK codebook.

According to another embodiment of the present disclosure, an HARQ-ACK codebook generation apparatus is further provided, which is applied to a UE and includes a transmitting module.

The transmitting module is configured to transmit a first PUCCH and/or a second PUCCH in a same slot according to a preset mode. The first PUCCH is a PUCCH corresponding to a first HARQ-ACK codebook, the second PUCCH is a PUCCH corresponding to a second HARQ-ACK codebook, and the first PUCCH and the second PUCCH do not overlap in a time domain.

According to another embodiment of the present disclosure, a PDSCH reception apparatus is further provided, which is applied to a UE and includes a second receiving module.

The second receiving module is configured to, in a case where at least one DS PDSCH scheduled by a base station and at least one SPS PDSCH configured by the base station overlap in a time domain, at least discard at least one first SPS PDSCH and receive at least one target SPS PDSCH and the at least one DS PDSCH. The at least one first SPS PDSCH is one or more SPS PDSCHs, that overlap the at least one DS PDSCH in the time domain, in the at least one SPS PDSCH.

According to another embodiment of the present disclosure, a PDSCH reception apparatus is further provided, which is applied to a UE and includes a grouping module and a third receiving module.

The grouping module is configured to group at least one DS PDSCH and at least one SPS PDSCH according to a preset priority, so as to obtain at least one PDSCH set. Each PDSCH set includes at least one DS PDSCH and/or at least one SPS PDSCH. The third receiving module is configured to determine, in each PDSCH set, a DS PDSCH to be received and/or an SPS PDSCH to be received in the PDSCH set according to a preset mode.

According to another embodiment of the present disclosure, an electronic apparatus is further provided, which includes a memory and a processor. The memory stores a computer program, and the processor is configured to run the computer program to perform any one of the abovementioned method embodiments.

By the embodiments of the present disclosure, a UE receives UL grant information sent by a base station, wherein a PUSCH scheduled by the UL grant information is used for the UE to transmit an HARQ-ACK codebook; and determines, according to a value of a DAI in the UL grant information and a situation that the UE receives PDSCHs, a corresponding mechanism to generate the HARQ-ACK codebook. Therefore, the embodiments of the present disclosure can solve the problem in a related art that the base station cannot effectively receive the HARQ-ACK codebook fed back by the UE, so as to achieve an effect that the base station effectively receives the HARQ-ACK codebook fed back by the UE.

BRIEF DESCRIPTION OF THE DRAWINGS

FIG. 4 is a flowchart (2) of an HARQ-ACK codebook generation method provided according to the embodiments of the present disclosure.

FIG. 5 is a flowchart of an HARQ-ACK codebook transmission method provided according to the embodiments of the present disclosure.

FIG. 6 is a flowchart (1) of a PDSCH reception method provided according to the embodiments of the present disclosure.

FIG. 7 is a flowchart (2) of a PDSCH reception method provided according to the embodiments of the present disclosure.

DETAILED DESCRIPTION

The present disclosure will be described below with reference to the drawings and in combination with the embodiments.

The terms "first", "second" and the like in the present disclosure are used to distinguish similar objects instead of describing a specific order or sequence.

In order to describe an HARQ-ACK codebook generation method, an HARQ-ACK codebook transmission method, a PDSCH reception method in the present disclosure, the technical terms and application scenarios involved in the embodiments of the present disclosure are described as follows.

In the present disclosure, the HARQ-ACK codebook generation method is applicable to a scenario where the understanding of a generation mechanism for an HARQ-ACK codebook in the base station and UE is inconsistent.

In another aspect, in a related art, if PUCCH1 of a high-priority HARQ-ACK codebook (referring to that a PDSCH corresponding to the HARQ-ACK codebook is indicated to have a high priority) and PUCCH2 of a low-priority HARQ-ACK codebook (referring to that a PDSCH corresponding to the HARQ-ACK codebook is indicated to have a low priority or a priority of the PDSCH corresponding to the HARQ-ACK codebook is not indicated) are in the same slot (which may also be equally replaced with subslot herein), and PUCCH1 and PUCCH2 completely or partially overlap each other, PUCCH2 of the low-priority HARQ-ACK codebook will be discarded, so that the low-priority HARQ-ACK codebook is also discarded simultaneously. The abovementioned action is carried out because PUCCH1 of the high-priority HARQ-ACK codebook needs to be transmitted normally due to the requirements of low delay and high reliability corresponding to the high-priority HARQ-ACK codebook.

In a related art, the UE can only support the construction of one HARQ-ACK codebook, so the UE can only be required to send a PUCCH of one HARQ-ACK codebook in one slot. The UE can simultaneously support the construction of two HARQ-ACK codebooks with different priorities. In the embodiments of the present disclosure, the HARQ-ACK codebook transmission method is applicable to the abovementioned scenario.

Figure 1:
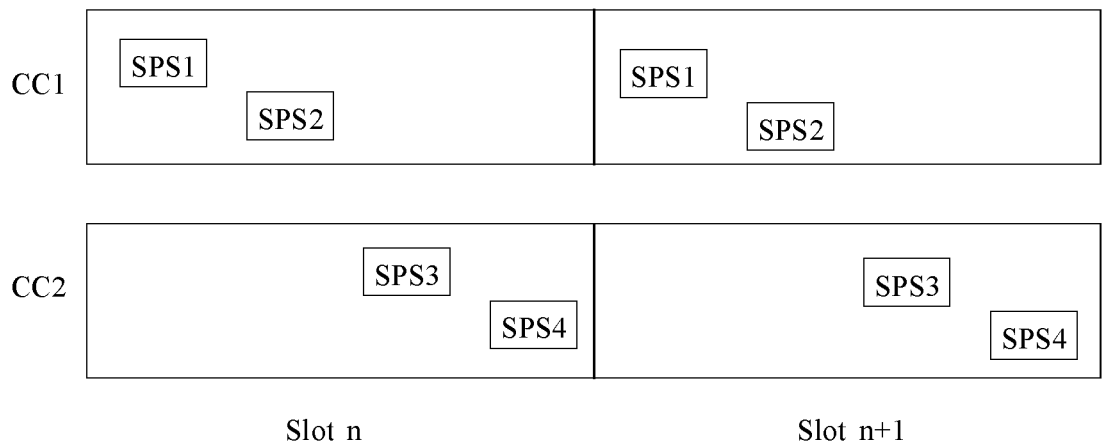
FIG. 1 is a schematic diagram of component carriers provided according to a related art.
Figure 2:
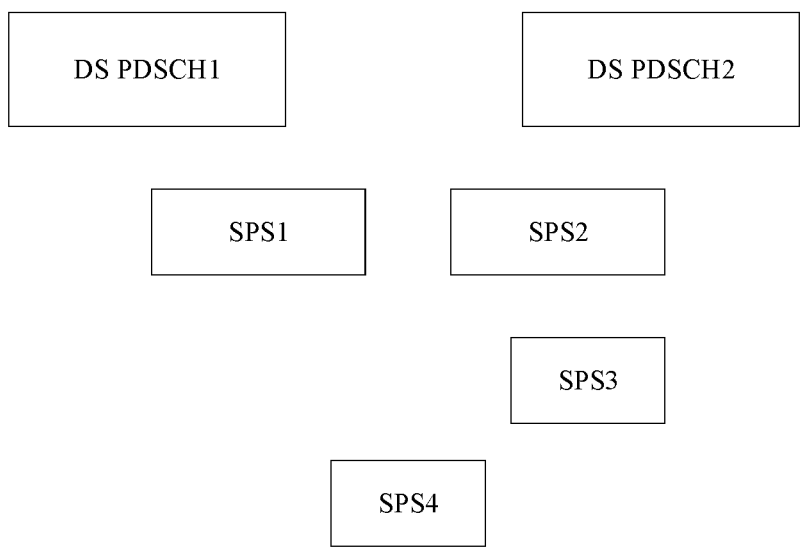
FIG. 2 is a schematic diagram of a relationship among PDSCHs provided according to a related art.

In another aspect, in the related art, multiple SPS PDSCHs may overlap DS PDSCHs in a time domain. FIG. 2 is a schematic diagram of a relationship among PDSCHs provided according to the related art. As shown in FIG. 2, in one slot, DS PDSCH1 and DS PDSCH2 respectively overlap SPS PDSCHs of multiple SPSs. Since the UE cannot process PDSCHs that overlap one another in a time domain, in the abovementioned case, which PDSCH the UE receives and performs HARQ-ACK feedback for cannot be determined. In the embodiments of the present disclosure, the PDSCH reception method is applicable to the abovementioned scenario.

The HARQ-ACK codebook generation method, the HARQ-ACK codebook transmission method, and the PDSCH reception method in the embodiments of the present disclosure are described in the following description.

Embodiment 1

Figure 3:
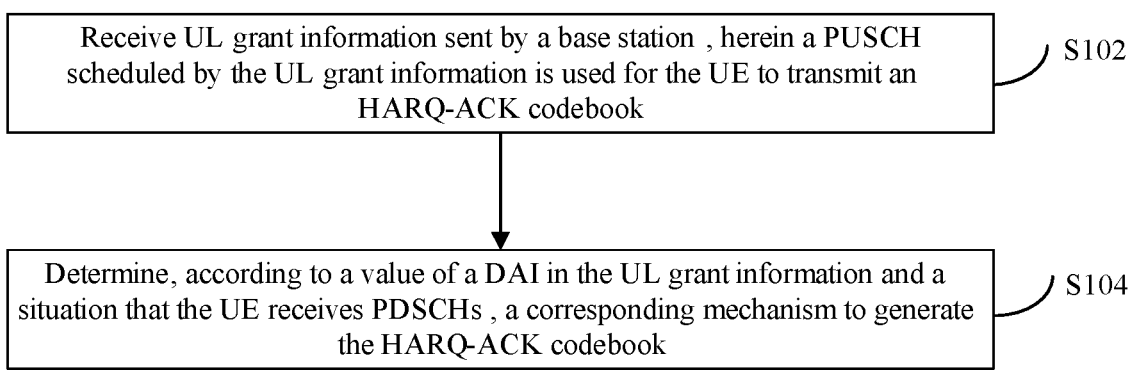
FIG. 3 is a flowchart (1) of an HARQ-ACK codebook generation method provided according to the embodiments of the present disclosure.

The present embodiment provides an HARQ-ACK codebook generation method, which is applied to a UE. FIG. 3 is a flowchart (1) of an HARQ-ACK codebook generation method provided according to the embodiments of the present disclosure. As shown in FIG. 3, the method in the present embodiment includes the following operations.

At S102, UL grant information sent by a base station is received. A PUSCH scheduled by the UL grant information is used for the UE to transmit an HARQ-ACK codebook.

At S104, a corresponding mechanism is determined, according to a value of a DAI in the UL grant information and a situation that the UE receives PDSCHs, to generate the HARQ-ACK codebook.

By the HARQ-ACK codebook generation method in the present embodiment, a UE receives UL grant information sent by a base station, wherein a PUSCH scheduled by the UL grant information is used for the UE to transmit an HARQ-ACK codebook; and determines, according to a value of a DAI in the UL grant information and a situation that the UE receives PDSCHs, a corresponding mechanism to generate the HARQ-ACK codebook. Therefore, the embodiment of the present disclosure can solve the problem in the related art that the base station cannot effectively receive the HARQ-ACK codebook fed back by the UE, so as to achieve an effect that the base station effectively receives the HARQ-ACK codebook fed back by the UE.

In the HARQ-ACK codebook generation method in the present embodiment, since the base station can indicate the mechanism that the base station expects the UE to use for generating the HARQ-ACK codebook through a value of DAI in the UL grant information, the UE can determine, according to the value of the DAI in the UL grant information and the condition of receiving the PDSCHs, the corresponding mechanism to generate the HARQ-ACK codebook, so as to make the generation mechanisms for the HARQ-ACK codebook of the UE and the base station consistent.

In the exemplary embodiment, in the abovementioned operation S102, the operation that the corresponding mechanism is determined, according to the value of the DAI in the UL grant information and the situation that the UE receives PDSCHs, to generate the HARQ-ACK codebook includes the following operations.

In a case where the value of the DAI is a first value or a second value, and the UE only receives multiple SPS PDSCHs, the UE generates HARQ-ACKs only for the plurality of SPS PDSCHs and forms an HARQ-ACK codebook from the HARQ-ACKs according to an SPS codebook mechanism.

In the abovementioned exemplary embodiment, the value of the DAI being a first value or a second value indicates a mechanism that the base station expects the UE to use for generating the HARQ-ACK codebook.

In one case of the abovementioned exemplary embodiment, when the value of the abovementioned DAI is a first value, and in a case where the UE only receives multiple SPS PDSCHs, the UE generates HARQ-ACKs only for the plurality of SPS PDSCHs and forms an HARQ-ACK codebook from the HARQ-ACKs according to an SPS codebook mechanism. Correspondingly, in the abovementioned case, when the value of the DAI is a second value, the base station expects the UE to form an HARQ-ACK codebook from the HARQ-ACKs according to a TDRA table codebook mechanism.

In another case of the abovementioned exemplary embodiment, when the value of the abovementioned DAI is a second value, and in a case where the UE only receives multiple SPS PDSCHs, the UE generates HARQ-ACKs only for the plurality of SPS PDSCHs and forms an HARQ-ACK codebook from the HARQ-ACKs according to an SPS codebook mechanism. Correspondingly, in the abovementioned case, when the value of the DAI is a first value, the base station expects the UE to form an HARQ-ACK codebook from the HARQ-ACKs according to a TDRA table codebook mechanism.

In an exemplary embodiment, the abovementioned first value is "0", and the abovementioned second value is "1".

The HARQ-ACK codebook generation method in the present embodiment is detailed through exemplary embodiments.

Exemplary Embodiment 1

In the exemplary embodiment, a base station transmits one or more SPS PDSCHs for a UE, and also schedules one or more DS PDSCHs (and/or one or more SPS releases, in the exemplary embodiment, the SPS release is processed in a same way as DS PDSCH, the same hereafter), and the base station expects the UE to generate an HARQ-ACK codebook only for this/these ("these" can also mean "this" herein, the same hereafter) SPS PDSCHs, and expects the UE to transmit the HARQ-ACK codebook finally through PUSCH scheduled by one UL grant (through control information transmitted by a PDCCH and used for scheduling the PUSCH) (that is to say, the base station expects the UE to generate an HARQ-ACK codebook, and the HARQ-ACKs contained in the HARQ-ACK codebook are only one or more HARQ-ACKs corresponding to the one or more SPS PDSCHs). In this case, when the base station transmits the UL grant, the value of the DAI in the UL grant is set as a first value (for example, the first value is 0), which is used for indicating the UE to generate an HARQ-ACK codebook according to an SPS codebook mechanism. This DAI parameter occupies only 1 bit.

The solution in the abovementioned exemplary embodiment has the following specific scenarios.

Scenario 1

Assuming that the UE does not encounter missed detection, the UE will correctly receive the one or more SPS PDSCHs, will also correctly receive the UL grant, and will find that an HARQ-ACK codebook needs to be generated only for the one or more SPS PDSCHs, this HARQ-ACK codebook needs to be transmitted in the PUSCH scheduled by the UL grant, and the value of the DAI in the UL grant is the first value, the UE generates this HARQ-ACK codebook according to the SPS codebook mechanism. For the instant case, this is the original intention of the base station.

Scenario 2

The original intention of the base station is to make the UE generate an HARQ-ACK according to a TDRA table cookbook, that is, the corresponding HARQ-ACKs in the HARQ-ACK codebook are from at least one SPS PDSCH and at least one DS PDSCH. This HARQ-ACK codebook is transmitted in the PUSCH scheduled by the UL grant. The base station sets the DAI in the UL grant to be the second value. Assuming that the UE encounters missed detection of the PDCCH (resulting in that part or all DS PDSCH are not received), the UE only correctly receives one or more SPS PDSCHs (even if there is no actual transmission in an SPS PDSCH cycle, since the cycle has already been determined, the UE also needs to generate HARQ-ACK for the SPS PDSCH cycle, which is also considered that the SPS PDSCH is received), also correctly receives the UL grant, and finds that an HARQ-ACK codebook needs to be generated for the SPS PDSCHs, this HARQ-ACK codebook needs to be transmitted in the PUSCH scheduled by the UL grant, and the value of the DAI in the UL grant is the second value (for example, the second value is 1). In such a case, although the UE finds that the HARQ-ACKs corresponding to the HARQ-ACK codebook are only for the received one or more SPS PDSCHs and the HARQ-ACK codebook should be generated according to the SPS codebook mechanism, the UE actually generates the HARQ-ACK codebook according to the TDRA table codebook mechanism since the DAI in the UL grant is the second value. For the instant case, this is the original intention of the base station, which solves a problem caused by missed detection. According to the indication of the DAI in the UL grant, the UE can know which mode to use for generating the HARQ-ACK codebook to be transmitted this time.

Correspondingly, on a UE side, when the UE expects to generate an HARQ-ACK codebook, this HARQ-ACK codebook is finally transmitted through the DS PUSCH scheduled by the UL grant, the value of the DAI in this UL grant is the first value (the UE only receives one or more SPS PDSCHs, and the HARQ-ACKs are for the one or more SPS PDSCHs), then the UE generates this HARQ-ACK codebook according to the SPS codebook mechanism. In fact, no matter whether the UE actually receives the PDSCH (including SPS PDSCH and DS PDSCH), the UE only needs to generate the HARQ-ACK codebook to be transmitted this time according to the mode indicated in the DAI in the UL grant, in other words, if this HARQ-ACK codebook is to be transmitted in a PUSCH scheduled by the UL grant, the UE determines the generation mode (that is, the SPS codebook mechanism or the TDRA table codebook mechanism) of this HARQ-ACK codebook according to the indication of the DAI in the UL grant.

Through the technical solution in the present exemplary embodiment, the UE additionally obtains the indication information of a generation mode of an HARQ-ACK codebook through UL grant, so as to avoid misunderstanding of the generation mode of HARQ-ACK codebook by the UE in case of missed detection.

Exemplary Embodiment 2

In the exemplary embodiment, a base station transmits one or more SPS PDSCHs for a UE, and also schedules one or more DS PDSCHs (and/or one or more SPS releases, in the present exemplary embodiment, the SPS release in the exemplary embodiment is processed in a same way as DS PDSCH, the same hereafter), and the base station expects the UE to generate an HARQ-ACK codebook only for this/these ("these" can also mean "this" herein, the same hereafter) SPS PDSCHs, and expects the UE to transmit the HARQ-ACK codebook finally through PUSCH scheduled by one UL grant (through control information transmitted by a PDCCH and used for scheduling the PUSCH) (that is to say, the base station expects the UE to generate an HARQ-ACK codebook, and the HARQ-ACKs contained in the HARQ-ACK codebook are only one or more HARQ-ACKs corresponding to the one or more SPS PDSCHs). In this case, when the base station transmits the UL grant, the value of the DAI in the UL grant is set as a second value (for example, the second value is 1), which is used for indicating the UE to generate an HARQ-ACK codebook according to an SPS codebook mechanism. This DAI parameter occupies only 1 bit.

The solution in the abovementioned exemplary embodiment has the following specific scenarios.

Scenario 1

Assuming that the UE does not encounter missed detection, the UE will correctly receive the one or more SPS PDSCHs, will also correctly receive the UL grant, and will find that an HARQ-ACK codebook needs to be generated only for the one or more SPS PDSCHs, this HARQ-ACK codebook needs to be transmitted in the PUSCH scheduled by the UL grant, and the value of the DAI in the UL grant is the second value, the UE generates this HARQ-ACK codebook according to the SPS codebook mechanism. For the instant case, this is the original intention of the base station.

Scenario 2

The original intention of the base station is to make the UE generate an HARQ-ACK according to a TDRA table cookbook, that is, the corresponding HARQ-ACKs in the HARQ-ACK codebook are from at least one SPS PDSCH and at least one DS PDSCH. This HARQ-ACK codebook is transmitted in the PUSCH scheduled by the UL grant. The base station sets the DAI in the UL grant to be the first value. Assuming that the UE encounters missed detection of the PDCCH (resulting in that part or all DS PDSCH are not received), the UE only correctly receives one or more SPS PDSCHs (even if there is no actual transmission in an SPS PDSCH cycle, since the cycle has already been determined, the UE also needs to generate HARQ-ACK for the SPS PDSCH cycle, which is also considered that the SPS PDSCH is received), also correctly receives the UL grant, and finds that an HARQ-ACK codebook needs to be generated for the SPS PDSCHs, this HARQ-ACK codebook needs to be transmitted in the PUSCH scheduled by the UL grant, and the value of the DAI in the UL grant is the first value (for example, the first value is 0). In such a case, although the UE finds that the HARQ-ACKs corresponding to the HARQ-ACK codebook are only for the received one or more SPS PDSCHs and the HARQ-ACK codebook should be generated according to the SPS codebook mechanism, the UE actually generates the HARQ-ACK codebook according to the TDRA table codebook mechanism since the DAI in the UL grant is the first value. For the instant case, this is the original intention of the base station, which solves a problem caused by missed detection. According to the indication of the DAI in the UL grant, the UE can know which mode to use for generating the HARQ-ACK codebook to be transmitted this time.

Correspondingly, on a UE side, when the UE expects to generate an HARQ-ACK codebook, this HARQ-ACK codebook is finally transmitted through the DS PUSCH scheduled by the UL grant, the value of the DAI in this UL grant is the second value (the UE only receives one or more SPS PDSCHs, and the HARQ-ACKs are for the one or more SPS PDSCHs), then the UE generates this HARQ-ACK codebook according to the SPS codebook mechanism. In fact, no matter whether the UE actually receives the PDSCH (including SPS PDSCH and DS PDSCH), the UE only needs to generate the HARQ-ACK codebook to be transmitted this time according to the mode indicated in the DAI in the UL grant, in other words, if this HARQ-ACK codebook is to be transmitted in a PUSCH scheduled by the UL grant, the UE determines the generation mode (that is, the SPS codebook mechanism or the TDRA table codebook mechanism) of this HARQ-ACK codebook according to the indication of the DAI in the UL grant.

The difference between the abovementioned exemplary embodiment 1 and exemplary embodiment 2 is that the first value and the second value in the DAI have different assignments. The different assignments of the first value and the second value are described below.

In a related art, if a base station schedules one or more SPS PDSCHs, and also schedules one or more DS PDSCHs for a UE, the base station expects the UE to generate an HARQ-ACK codebook, the HARQ-ACKs contained in this HARQ-ACK codebook are from one or more SPS PDSCH and one or more DS PDSCHs, and expects this HARQ-ACK codebook to be transmitted through a PUSCH scheduled by UL grant, in such as case, the base station sets the value of the DAI in this UL grant as a second value (that is, the value of the DAI is set as 1), which is used for indicating the UE to generate an HARQ-ACK codebook according to a TDRA Table mechanism. This HARQ-ACK codebook is transmitted in the PUSCH scheduled by this UL grant. In a related art, as long as the UL grant is set as the first value (that is, the value is set as 0), the UE either does not generate an HARQ-ACK codebook, or only generates 1-bit HARQ-ACK information for only one DS PDSCH or one SPS PDSCH or one SPS release when the UE receives only one DS PDSCH or one SPS PDSCH or one SPS release.

Table 1 is a corresponding relationship table when an HARQ-ACK codebook is transmitted in a PUSCH scheduled by UL grant. Analysis is provided as follows in combination with Table 1. In Table 1, "0" represents that the base station does not transmit any PDSCH, "1" represents that the base station transmits only one PDSCH, ">=2" represents that the base station transmits two or more PDSCHs. Line numbers 3 and 4 in Table 1 respectively correspond to the abovementioned exemplary embodiment 1 and exemplary embodiment 2.

TABLE 1

Corresponding relationship table when an HARQ-ACK codebook is transmitted in PUSCH scheduled by UL grant

| Line number | DS PDSCH | SPS PDSCH | DL DAI | Value of DAI (in UL grant information) | Possible receiving case at UE | UE behavior required in standard | HARQ-ACK codebook formation condition |
|---|---|---|---|---|---|---|---|
| 1 | 0 | 0 | | 0 | Nothing is received | No requirement | No ARQ-ACK is generated (that is, 0-bit HARQ-ACK) |
| 2 | 0 | 1 | | 0 | One SPS PDSCH is received (the receiving of the SPS PDSCH is described in the text) | Only one SPS PDSCH is received | 1-bit HARQ-ACK |
| 3 (Exemplary embodiment 1) | 0 | >=2 | | 0 | One or more SPS PDSCHs are received | Only multiple SPS PDSCHs are received | SPS codebook mechanism (new) |
| 4 (Exemplary embodiment 2) | 0 | >=2 | | 1 | One or more SPS PDSCHs are received | Only multiple SPS PDSCHs are received | SPS codebook mechanism (new) |
| 5 | 1 | 0 | DCI 1-0, and DAI = 1 | 0 | One DS PDSCH is received or nothing is received (Missed detection of DS PDSCH) | Only one DS PDSCH is received | 1-bit HARQ-ACK |
| 6 | 1 | 1 | | 1 | One DS PDSCH and/or one SPS PDSCH is received | No requirement | TDRA Table codebook mechanism |
| 7 | 1 | >=2 | | 1 | One DS PDSCH and/or one plurality SPS PDSCH is received | No requirement | TDRA Table codebook mechanism |
| 8 | >=2 | 0 | | 1 | One or more DS PDSCH is received, or nothing is received | No requirement | TDRA Table codebook mechanism |
| 9 | >=2 | 1 | | 1 | One or more DS PDSCHs are received, and one SPS PDSCH is received | No requirement | TDRA Table codebook mechanism |
| 10 | >=2 | >=2 | | 1 | One or more DS PDSCHs are received, and one or more SPS PDSCHs are received | No requirement | TDRA Table codebook mechanism |

If the setting for the value of the DAI in the UL grant in exemplary embodiment 1 is used, and if the base station executes according to the case corresponding to line number 7 in Table 1, when the UE encounters missed detection of DS PDSCH, the UE detects that the DAI in the UL grant is 1, and the UE actually only receives multiple SPS PDSCHs, then the UE directly and undoubtedly determines that the HARQ-ACK codebook is generated according to the TDRA table codebook mechanism. Here, if the base station actually executes according to line number 3, the base station would set the DAI in UL grant as 0.

If the setting for the value of the DAI in the UL grant in exemplary embodiment 2 is used, and if the base station executes according to the case corresponding to the line number 7 in Table 1, when the UE encounters missed detection of DS PDSCH, the UE detects that the DAI in the UL grant is 1, and the UE actually only receives multiple SPS PDSCHs, then the UE cannot determine which mechanism to use for generating the HARQ-ACK codebook since the UE cannot tell which one of line number 4 or line number 7 to follow. In such a case, the UE may select to execute according to line number 4, but the original intention of the base station is to expect the UE to execute according to line number 7. In such a case, there is ambiguity between the understanding of the base station and the understanding of the UE, and the feedback of multiple SPS PDSCHs is affected in this case.

Based on the abovementioned analysis, the setting of the value of the DAI in UL grant in the abovementioned exemplary embodiment 1 can avoid the inconsistency between the understanding of the base station and the understanding of the UE caused by the conflicts between the value setting for the DAI in the UL grant and the indication content in the related art when the UE encounters missed detection.

According to the description of the foregoing implementations, the method in the abovementioned embodiments may be implemented by software and a necessary universal hardware platform or by hardware. The technical solution of the embodiments of the present disclosure may be essentially embodied in the form of a software product. The computer software product is stored in a storage medium (such as a ROM/RAM, a magnetic disk, and an optical disc), including a number of instructions for enabling a terminal device (which may be a mobile phone, a computer, a server, or a network device, etc.) to perform the methods described in various embodiments of the present disclosure.

Embodiment 2

The present embodiment provides an HARQ-ACK codebook generation method, which is applied to a base station. FIG. 4 is a flowchart (2) of an HARQ-ACK codebook generation method provided according to the embodiments of the present disclosure. As shown in FIG. 4, the method in the present embodiment includes the following operations.

At S202, UL grant information is sent to a UE, and a mechanism for the UE to generate the HARQ-ACK codebook is determined by setting a value of a DAI in the UL grant information and indicating a situation of PDSCHs corresponding to HARQ-ACKs in the HARQ-ACK codebook. A PUSCH scheduled by the UL grant information is used for the UE to transmit the HARQ-ACK codebook.

The remaining exemplary embodiments and technical effects in the present embodiment all correspond to the HARQ-ACK codebook generation method provided in Embodiment 1, and will not be elaborated herein.

In an exemplary embodiment, the operation in the abovementioned S202 that the mechanism for the UE to generate the HARQ-ACK codebook is determined by setting the value of the DAI in the UL grant information and indicating the situation of PDSCHs corresponding to the HARQ-ACKs in the HARQ-ACK codebook includes the following operation.

In a case where the value of the DAI is a first value or a second value and it is indicated that the PDSCHs corresponding to the HARQ-ACKs in the HARQ-ACK codebook are only multiple SPS PDSCHs, the base station determines that the mechanism for the UE to generate the HARQ-ACK codebook is an SPS codebook mechanism.

In an exemplary embodiment, the first value is "0", and the second value is "1".

According to the description of the foregoing implementations, the method in the abovementioned embodiments may be implemented by software and a necessary universal hardware platform or by hardware. The technical solution of the embodiments of the present disclosure may be essentially embodied in the form of a software product. The computer software product is stored in a storage medium (such as a ROM/RAM, a magnetic disk, and an optical disc), including a number of instructions for enabling a terminal device (which may be a mobile phone, a computer, a server, or a network device, etc.) to perform the methods described in various embodiments of the present disclosure.

Embodiment 3

The present embodiment provides an HARQ-ACK codebook transmission method, which is applied to a UE. FIG. 5 is a flowchart of an HARQ-ACK codebook transmission method provided according to the embodiments of the present disclosure. As shown in FIG. 5, the HARQ-ACK codebook transmission method in the present embodiment includes the following operations.

At S302, a first PUCCH and/or a second PUCCH is transmitted in a same slot according to a preset mode. The first PUCCH is a PUCCH corresponding to a first HARQ-ACK codebook, the second PUCCH is a PUCCH corresponding to a second HARQ-ACK codebook, and the first PUCCH and the second PUCCH do not overlap in a time domain.

In the present embodiment, multiple PUCCHs need to be transmitted in the same slot. For example, in the case where the first PUCCH and the second PUCCH are transmitted in the abovementioned embodiment, by virtue of the HARQ-ACK codebook transmission method in the present embodiment, the first PUCCH and the second PUCCH can be transmitted in the same slot in a case of not overlapping in a time domain.

In an exemplary embodiment, the abovementioned operation S302 that the first PUCCH and/or the second PUCCH are transmitted in the same slot according to the preset mode includes:

the first PUCCH and/or the second PUCCH are transmitted in the same slot according a priority between the first HARQ-ACK codebook and the second HARQ-ACK codebook. The priority of the first HARQ-ACK codebook is higher than the priority of the second HARQ-ACK codebook.

In an exemplary embodiment, the operation that the first PUCCH and/or the second PUCCH are transmitted in the same slot according the priority between the first HARQ-ACK codebook and the second HARQ-ACK codebook includes the following operations.

In a case where the UE is configured to transmit the second PUCCH in an Nth slot, and the UE receives a request to transmit, in the Nth slot, the first PUCCH, the UE transmits the first PUCCH and the second PUCCH in the Nth slot; or in a case where the UE is configured to transmit the second PUCCH in an Nth slot, and the UE receives a request to transmit, in the Nth slot, the first PUCCH, the UE transmits the first PUCCH and discards the second PUCCH in the Nth slot.

In the abovementioned exemplary embodiment, the first PUCCH and the second PUCCH are transmitted in the same slot in different modes according the priorities of the first HARQ-ACK codebook and the second HARQ-ACK codebook. The abovementioned preset mode may be determined according to a service requirement, which is described by the following exemplary embodiment, and will not be elaborated herein.

The HARQ-ACK codebook transmission method in the present embodiment is described through exemplary embodiments.

Exemplary Embodiment 3

In the present exemplary embodiment, if the UE is configured with two HARQ-ACK codebooks (one has a high priority and the other one has a low priority), the UE is allowed to transmit PUCCHs of the two HARQ-ACK codebooks (respectively referred to as PUCCH1 of a high-priority HARQ-ACK codebook and PUCCH2 of a low-priority HARQ-ACK codebook) in one slot, and the PUCCH1 and the PUCCH2 do not overlap in a time domain. That is to say, the base station and the UE agree that if the UE is configured with two HARQ-ACK codebooks, then the UE is allowed to transmit PUCCH1 and PUCCH2 for the HARQ-ACK codebooks of two priorities in the same slot under the premise that PUCCH1 and PUCCH2 do not overlap in a time domain.

In the present exemplary embodiment, it is possible to require whether the PUCCHs of the two HARQ-ACK codebooks are in order so as to reduce the complexity of the UE. For example, the operation may be performed according to the abovementioned mode under the premise that the PUCCHs of the two HARQ-ACK codebooks are in order (that is, if the PUCCH of HARQ-ACK codebook 1 is in front of the PUCCH of HARQ-ACK codebook 2, then the PDSCH corresponding to HARQ-ACK codebook 1 also needs to be in front of the PDSCH corresponding to HARQ-ACK codebook 2, that is, the two HARQ-ACK codebooks are in order, or in other words, the two HARQ-ACK codebooks are not in reverse order). If the PUCCHs of the two HARQ-ACK codebooks are in a reverse order, the abovementioned processing solution is prohibited, because this reverse order will require the UE to have higher processing capability. This limitation is optional.

From the perspective of a UE, if the UE is required to transmit PUCCH2 of a low-priority HARQ-ACK codebook in slot n, and then is required to transmit PUCCH1 of a high-priority HARQ-ACK codebook in slot n, as long as PUCCH1 and PUCCH2 do not overlap in a time domain, the UE can transmit PUCCH1 of the high-priority HARQ-ACK codebook and also transmit PUCCH2 of the low-priority HARQ-ACK codebook. In this way, the HARQ-ACK codebooks of the two priorities are actually both transmitted, which ensures the reliability and low delay of the high-priority HARQ-ACK codebook and also considers the transmission of the low-priority HARQ-ACK codebook. According to this mode, each HARQ-ACK codebook allows one PUCCH to be transmitted in one slot, as long as the PUCCHs of respective HARQ-ACK codebooks do not overlap each other in a time domain.

For the case that the UE is configured with one HARQ-ACK codebook, a PUCCH of only one HARQ-ACK codebook can be transmitted.

By using the technical solution in the present exemplary embodiment, even if PUCCH2 of the low-priority HARQ-ACK codebook is scheduled to be transmitted in slot n first, PUCCH1 of the later high-priority HARQ-ACK codebook can still continue to be transmitted in slot n, and PUCCH1 and PUCCH2 do not overlap in a time domain. In this mode, the problems that the high-priority HARQ-ACK codebook cannot be transmitted in slot n and may be delayed can be avoided.

This mode can also avoid a result that PUCCH1 is transmitted but PUCCH2 is discarded when the base station forcibly schedules, in slot n, PUCCH2 and PUCCH1 overlapping each other in a time domain. The low-priority HARQ-ACK codebook is prevented from being discarded from slot n, which ensures the transmission of both HARQ-ACK codebooks.

The solution in the present exemplary embodiment is applicable to a situation where the two HARQ-ACK codebooks are both based on a slot, or the two HARQ-ACK codebooks are both based on a subslot, or the two HARQ-ACK codebooks are based on a slot and a subslot respectively.

Exemplary Embodiment 4

In the present exemplary embodiment, if the UE is configured with two HARQ-ACK codebooks (one has a high priority and the other one has a low priority), and even if PUCCH1 of the high-priority HARQ-ACK codebook and PUCCH2 of the low-priority HARQ-ACK codebook of the UE do not overlap in a time domain, the UE transmits PUCCH1 of the high-priority HARQ-ACK codebook in one slot, and discards PUCCH2 of the low-priority HARQ-ACK codebook. That is to say, the base station and the UE agree that if the UE is configured with two HARQ-ACK codebooks, if PUCCH2 of the low-priority HARQ-ACK codebook has been scheduled for transmission in slot n, PUCCH1 of the high priority HARQ-ACK codebook can also be scheduled in slot n. As long as PUCCH1 and PUCCH2 do not overlap in a time domain, the UE discards PUCCH2 and only transmits high-priority PUCCH1.

In the present exemplary embodiment, whether the PUCCHs of the two HARQ-ACK codebooks are in order may be analyzed. Since the UE actually transmits only one PUCCH in this slot, the complexity of the UE is affected slightly no matter whether the PUCCHs of the two HARQ-ACK codebooks are in reverse order or in order. Therefore, the order of the PUCCHs of the two HARQ-ACK codebooks does not need to be limited explicitly in the present exemplary embodiment.

From the perspective of a UE, if the UE is required to transmit PUCCH2 of a low-priority HARQ-ACK codebook in slot n, and then is required to transmit PUCCH1 of a high-priority HARQ-ACK codebook in slot n, even if PUCCH1 and PUCCH2 do not overlap in a time domain, the UE still transmits PUCCH1 of the high-priority HARQ-ACK codebook and discards PUCCH2 of the low-priority HARQ-ACK codebook. In this way, only a high-priority HARQ-ACK codebooks is transmitted actually, which ensures the reliability and low delay of the high-priority HARQ-ACK codebook.

For the case that the UE is configured with one HARQ-ACK codebook, a PUCCH of only one HARQ-ACK codebook can be transmitted.

By using the technical solution in the present exemplary embodiment, even if PUCCH2 of the low-priority HARQ-ACK codebook is scheduled to be transmitted in slot n first, if PUCCH1 of the later high-priority HARQ-ACK codebook is also scheduled to be transmitted in slot n, and PUCCH1 and PUCCH2 do not overlap in a time domain, then PUCCH1 of the high-priority HARQ-ACK codebook is transmitted in slot n, and PUCCH2 of the low-priority HARQ-ACK codebook is discarded. In this mode, the problems that the high-priority HARQ-ACK codebook cannot be transmitted in slot n and may be delayed can be avoided.

The solution in the present exemplary embodiment is applicable to a situation where the two HARQ-ACK codebooks are both based on a slot, or the two HARQ-ACK codebooks are both based on a subslot, or the two HARQ-ACK codebooks are based on a slot and a subslot respectively.

According to the description of the foregoing implementations, the method in the abovementioned embodiments may be implemented by software and a necessary universal hardware platform or by hardware. The technical solution of the embodiments of the present disclosure may be essentially embodied in the form of a software product. The computer software product is stored in a storage medium (such as a ROM/RAM, a magnetic disk, and an optical disc), including a number of instructions for enabling a terminal device (which may be a mobile phone, a computer, a server, or a network device, etc.) to perform the methods described in various embodiments of the present disclosure.

Embodiment 4

The present embodiment provides a PDSCH reception method, which is applied to a UE. FIG. 6 is a flowchart (1) of a PDSCH reception method provided according to the embodiments of the present disclosure. As shown in FIG. 6, the method in the present embodiment includes the following operations.

At S402, in a case where at least one DS PDSCH scheduled by a base station and at least one SPS PDSCH configured by the base station overlap in a time domain, at least one first SPS PDSCH is discarded, and at least one target SPS PDSCH and the at least one DS PDSCH are received. The at least one first SPS PDSCH is one or more SPS PDSCHs, that overlap the at least one DS PDSCH in the time domain, in the at least one SPS PDSCH.

The abovementioned first SPS PDSCH may include one or more SPS PDSCHs.

Through the technical solution in the present embodiment, the base station and the UE can have consistent understanding on the received PDSCH when the DS PDSCH overlaps the SPS PDSCH in a time domain.

In an exemplary embodiment, the abovementioned operation S402 that at least one target SPS PDSCH is received includes the following operations.

The at least one target SPS PDSCH is determined in at least one second SPS PDSCH according to an SPS index, and the at least one target SPS PDSCH is received. The at least one second SPS PDSCH is one or more SPS PDSCHs, other than the at least one first SPS PDSCH, in the at least one SPS PDSCH.

The abovementioned second SPS PDSCH may include one or more SPS PDSCHs.

In an exemplary embodiment, the abovementioned operation that the at least one target SPS PDSCH is determined in the at least one second SPS PDSCH according to the SPS index includes the following operation.

An SPS PDSCH with a lowest SPS index in the at least one second SPS PDSCH is determined as the target SPS PDSCH.

In an exemplary embodiment, the abovementioned operation that the at least one target SPS PDSCH is determined in the at least one second SPS PDSCH according to the SPS index includes the following operations.

An SPS PDSCH set is established according to the at least one second SPS PDSCH, an SPS PDSCH with a lowest SPS index in the established SPS PDSCH set is determined as the target SPS PDSCH, at least one SPS PDSCH, that overlaps the target SPS PDSCH in the time domain, in the established SPS PDSCH set is determined as at least one SPS PDSCH to be discarded, and the at least one SPS PDSCH to be discarded is discarded. An SPS PDSCH set is re-established according to at least one SPS PDSCH, other than the target SPS PDSCH and the at least one SPS PDSCH to be discarded, in the established SPS PDSCH set, and following operations are repeated until each SPS PDSCH of the at least one second SPS PDSCH is determined as either the target SPS PDSCH or the SPS PDSCH to be discarded:

an SPS PDSCH with a lowest SPS index in the re-established SPS PDSCH set is determined as the target SPS PDSCH, at least one SPS PDSCH, that overlaps the target SPS PDSCH in the time domain, in the re-established SPS PDSCH set is determined as at least one SPS PDSCH to be discarded, and the at least one SPS PDSCH to be discarded is discarded; and an SPS PDSCH set is re-established according to at least one SPS PDSCH, other than the target SPS PDSCH and the at least one SPS PDSCH to be discarded, in the re-established SPS PDSCH set.

In the abovementioned exemplary embodiment, the SPS PDSCHs in the SPS PDSCH set are dynamically adjusted. First, an SPS PDSCH set may be established according to the at least one second SPS PDSCH, and an SPS PDSCH with a lowest SPS index in the SPS PDSCH set may be determined as the target SPS PDSCH (denoted as the first target SPS PDSCH), and the UE may receive the first target SPS PDSCH. After that, there are SPS PDSCHs that overlap the first target SPS PDSCH in a time domain in the SPS PDSCH set, and these SPS PDSCHs are determined as SPS PDSCHs to be discarded and then discarded. As such, the SPS PDSCHs in the original SPS PDSCH set include at least one second SPS PDSCH excluding the first target SPS PDSCH and the SPS PDSCHs to be discarded.

After that, the SPS PDSCH set may be re-established according to the abovementioned remaining second SPS PDSCH, and then the abovementioned operations are repeated, that is, an SPS PDSCH with a lowest SPS index is determined as the target SPS PDSCH (denoted as the second target SPS PDSCH) in the new SPS PDSCH set, and the UE can receive the second target SPS PDSCH. After that, there are SPS PDSCHs that overlap the second target SPS PDSCH in a time domain in the new SPS PDSCH set, and these SPS PDSCHs are determined as SPS PDSCHs to be discarded and then discarded. The operations are repeated until each SPS PDSCH in the second SPS PDSCHs is received or discarded, and the processing ends.

The PDSCH reception method in the present embodiment is described below through exemplary embodiments.

Exemplary Embodiment 5

In the present exemplary embodiments, in a case where DS PDSCHs and multiple SPS PDSCHs configured by SPS overlap in a time domain in one slot, the PDSCHs received by the UE are determined in the following mode.

The SPS PDSCHs that overlap the DS PDSCHs in a time domain are discarded (that is, the UE may not receive these SPS PDSCHs), but the DS PDSCHs are received. For the remaining SPS PDSCHs, the SPS PDSCH with the lowest SPS index may be received (for the UE that can only process one PDSCH in one slot). Alternatively, the remaining SPS PDSCHs may be processed in the following modes.

First, an SPS PDSCH with a lowest SPS index is selected, SPS PDSCHs that overlap the SPS PDSCH with the lowest SPS index in a time domain are discarded, and the SPS PDSCH with the lowest SPS index is received. Then, the abovementioned operations are repeated for the remaining SPS PDSCHs until all SPS PDSCHs have been subjected to the abovementioned operations.

Taking FIG. 2 as an example, the result obtained in the abovementioned first mode is that DS PDSCH1, DS PDSCH2, and SPS PDSCH4 are all received, and the remaining SPS PDSCHs are all discarded (not received).

According to the description of the foregoing implementations, the method in the abovementioned embodiments may be implemented by software and a necessary universal hardware platform or by hardware. The technical solution of the embodiments of the present disclosure may be essentially embodied in the form of a software product. The computer software product is stored in a storage medium (such as a ROM/RAM, a magnetic disk, and an optical disc), including a number of instructions for enabling a terminal device (which may be a mobile phone, a computer, a server, or a network device, etc.) to perform the methods described in various embodiments of the present disclosure.

Embodiment 5

The present embodiment provides a PDSCH reception method, which is applied to a UE. FIG. 7 is a flowchart (2) of a PDSCH reception method provided according to the embodiments of the present disclosure. As shown in FIG. 7, the method in the present embodiment includes the following operations.

At S502, at least one DS PDSCH and at least one SPS PDSCH are grouped according to a preset priority, so as to obtain at least one PDSCH set. Each PDSCH set includes at least one DS PDSCH and/or at least one SPS PDSCH.

At S504, in each PDSCH set, a DS PDSCH to be received and/or an SPS PDSCH to be received in the PDSCH set is determined according to a preset mode.

According to the PDSCH reception method in the abovementioned embodiment, at least one DS PDSCH and at least one SPS PDSCH may be grouped according to the priority, and the PDSCHs of each grouped PDSCH set are received or discarded. Each of the abovementioned PDSCHs may include both the DS PDSCH and the SPS PDSCH (or either both the DS PDSCH or the SPS PDSCH), that is, the difference between the DS PDSCH and the SPS PDSCH is not considered during grouping.

Compared with the PDSCH reception method provided in Embodiment 4, the PDSCH reception method in the present embodiment introduces priority when determining the reception of the PDSCH, so that the reception of the UE meets a service requirement better.

In an exemplary embodiment, the abovementioned operation S504 that the DS PDSCH to be received and/or the SPS PDSCH to be received in the PDSCH set is determined in each PDSCH set according to the preset mode includes the following operations.

In a case where the PDSCH set only includes at least one SPS PDSCH, an SPS PDSCH set is established according to the at least one SPS PDSCH, an SPS PDSCH with a lowest SPS index in the SPS PDSCH set is determined as a target SPS PDSCH, and at least one SPS PDSCH, that overlaps the target SPS PDSCH in a time domain, in the established SPS PDSCH set is determined as at least one SPS PDSCH to be discarded, and then discarded; an SPS PDSCH set is re-established according to at least one SPS PDSCH, other than the target SPS PDSCH and the at least one SPS PDSCH to be discarded, in the established SPS PDSCH set, and the following operations are repeated until each of the at least one SPS PDSCH is determined as either the target SPS PDSCH or the SPS PDSCH to be discarded:

an SPS PDSCH with a lowest SPS index in the re-established SPS PDSCH set is determined as a target SPS PDSCH, and at least one SPS PDSCH, that overlaps the target SPS PDSCH in the time domain, in the re-established SPS PDSCH set is determined as at least one SPS PDSCH to be discarded, and then discarded; an SPS PDSCH set is re-established according to at least one SPS PDSCH, other than the target SPS PDSCH and the at least one SPS PDSCH to be discarded, in the re-established SPS PDSCH set; and the target SPS PDSCH is determined as the SPS PDSCH to be received.

In the abovementioned exemplary embodiment, the SPS PDSCHs in the SPS PDSCH set are dynamically adjusted. First, the SPS PDSCH set can be established according to the PDSCH set, and the SPS PDSCH with the lowest SPS index in the SPS PDSCH set may be determined as the target SPS PDSCH (denoted as the first target SPS PDSCH), and the UE may receive the first target SPS PDSCH. After that, there are SPS PDSCHs that overlap the first target SPS PDSCH in a time domain in the SPS PDSCH set, and these SPS PDSCHs are determined as SPS PDSCHs to be discarded and then discarded. The SPS PDSCHs in the original SPS PDSCH set include the SPS PDSCHs excluding the first target SPS PDSCH and the SPS PDSCHs to be discarded.

After that, the SPS PDSCH set may be re-established according to the abovementioned remaining SPS PDSCHs, and then the abovementioned operations are repeated, that is, the SPS PDSCH with the lowest SPS index is determined as the target SPS PDSCH (denoted as the second target SPS PDSCH) in the new SPS PDSCH set, and the UE can receive the second target SPS PDSCH. After that, there are SPS PDSCHs that overlap the second target SPS PDSCH in a time domain in the new SPS PDSCH set, and these SPS PDSCHs are determined as SPS PDSCHs to be discarded and then discarded. The operations are repeated until each SPS PDSCH in the second SPS PDSCHs is either received or discarded, and the processing ends.

In an exemplary embodiment, the abovementioned operation S504 that the DS PDSCH to be received and/or the SPS PDSCH to be received in the PDSCH set is determined in each PDSCH set according to the preset mode includes the following operations.

In a case where at least one DS PDSCH and at least one SPS PDSCH are included in the PDSCH set, at least one first SPS PDSCH is discarded, and an SPS PDSCH with a lowest SPS index in at least one second SPS PDSCH is determined as a target SPS PDSCH; the target SPS PDSCH is determined as the SPS PDSCH to be received, and the at least one DS PDSCH in the PDSCH set is determined as the DS PDSCH to be received. The at least one first SPS PDSCH is one or more SPS PDSCHs, that overlap the at least one DS PDSCH in a time domain, in the at least one SPS PDSCH in the PDSCH set, and the at least one second SPS PDSCH is one or more SPS PDSCHs, other than the at least one first SPS PDSCH, in the at least one SPS PDSCH in the PDSCH set.

In an exemplary embodiment, the method in the present embodiment further includes the following operation.

In a case where a first PDSCH set overlaps a second PDSCH set in a time domain, the second PDSCH set is discarded. Herein, the first PDSCH set and the second PDSCH set are any two PDSCH sets of a plurality of PDSCH sets, and a priority of the first PDSCH set is higher than a priority of the second PDSCH set.

The PDSCH reception method in the present embodiment is described below through exemplary embodiments.

Exemplary Embodiment 6

In a case where DS PDSCHs and multiple SPS PDSCHs configured by SPS overlap in a time domain in one slot, the PDSCHs received by the UE may be determined in the following mode.

All PDSCHs (including one or more DS PDSCHs and one or more SPS PDSCHs) are grouped (i.e., divided into groups) according to configured priorities (both the one or more DS PDSCHs and the one or more SPS PDSCHs have priority indications, and there are two priorities respectively being a high priority and a low priority). The PDSCHs in the same group are processed in the following mode.

If there are only one or more SPS PDSCHs in the group, the SPS PDSCH with the lowest SPS index is selected for receiving (for the UE that can only process one PDSCH in one slot).

If there are both the one or more DS PDSCHs and the one or more SPS PDSCHs in the group, the SPS PDSCH with the lowest SPS index is selected, one or more SPS PDSCHs that overlap the SPS PDSCH with the lowest SPS index in a time domain are discarded, and the SPS PDSCH with the lowest SPS index is received. Then, the abovementioned operations are repeated for the remaining SPS PDSCHs until all SPS PDSCHs have been subjected to the abovementioned operations. Alternatively, the DS PDSCH may be regarded as the SPS PDSCH with the lowest index, and one or more SPS PDSCHs that overlap the DS PDSCH in a time domain may be discarded.

After completing the processing for the PDSCHs of each group, the PDSCHs can be processed according to the following principle: if a high-priority PDSCH and a low-priority PDSCH overlap in a time domain, the low-priority PDSCH is discarded and the high-priority PDSCH is received.

According to the description of the foregoing implementations, the method in the abovementioned embodiments may be implemented by software and a necessary universal hardware platform or by hardware. The technical solution of the embodiments of the present disclosure may be essentially embodied in the form of a software product. The computer software product is stored in a storage medium (such as a ROM/RAM, a magnetic disk, and an optical disc), including a number of instructions for enabling a terminal device (which may be a mobile phone, a computer, a server, or a network device, etc.) to perform the methods described in various embodiments of the present disclosure.

On the basis of the abovementioned embodiments, other applicable scenarios of the HARQ-ACK codebook generation method, the HARQ-ACK codebook transmission method, and the PDSCH reception method in the embodiments of the present disclosure are described as follows through exemplary embodiments.

Exemplary Embodiment 7

In the related art, when a UE is configured with multiple SPSs, if the SPS PDSCHs of these SPSs overlap in a time domain in some slots, the UE only receives the SPS PDSCH with the lowest index, and cannot receive the other SPS PDSCHs. Moreover, corresponding HARQ-ACK is generated only for this SPS PDSCH, and the HARQ-ACKs are not generated for the other SPS PDSCHs. This method is simple.

However, when the UE is configured with multiple SPSs, if the configured SPSs overlap each other in a time domain, according to the abovementioned rules, there is only one SPS PDSCH actually processed finally. Therefore, for a base station, if multiple SPSs are configured for the UE and these SPSs overlap each other in a time domain, no benefit seems to be achieved.

In the present exemplary embodiment, the case that the UE is configured with multiple SPSs is described, and the solution can avoid the resource waste caused by some meaningless configurations.

In the present exemplary embodiment, if the UE is configured with multiple SPSs, and these SPSs have the same cycle, the UE expects the SPS PDSCHs of these SPSs to be configured as time division in a slot (that is, the SPS PDSCHs of these SPSs will not overlap in a time domain in a slot). In such a case, if there is a UE having the capability to process multiple time division PDSCHs in a slot, the UE can receive (and decode) these SPS PDSCHs and generate corresponding HARQ-ACKs for these SPS PDSCHs.

That is to say, if the base station expects to configure multiple SPS PDSCHs for the UE, and the cycles of these SPS PDSCHs are the same, then the base station needs to configure the SPS PDSCHs of these SPSs in time division in a slot (that is, these SPS PDSCHs do not overlap in a time domain), that is, the base station prohibits the configuration of SPS PDSCHs of multiple SPSs with the same cycle from overlapping in a time domain in a slot.

For example, assuming that two SPSs are configured for the UE and the cycles for the two SPSs are both one slot, the resources of SPS PDSCH of SPS1 may be symbols 3 to 7 in the slot, and the resources of SPS PDSCH of SPS2 may be symbols 10 to 13 in the slot. In this way, although the two SPSs have the same cycle, the SPS PDSCH is time-division in the time domain, so this configuration is actually effective, because the transmission of two SPS PDSCHs in a slot can be realized.

If the UE is configured with multiple SPSs, and the cycles of these SPS are different, the SPS PDSCHs of these SPSs are allowed to overlap in a time domain in the overlapping slot. If the SPS PDSCHs of these SPSs overlap in a time domain, the processing mechanism in the related art can be used. For example, the SPS PDSCH of the SPS with the lowest index is always received, and a corresponding HARQ-ACK is generated for the SPS PDSCH.

On this basis, in the present exemplary embodiment, when the base station configures multiple SPSs for the UE, if the cycles of these SPSs are the same, the base station always configures the SPS PDSCHs in time division in one slot. Correspondingly, on a UE side, if multiple SPSs are configured and the cycles of these SPSs are the same, the UE does not expect these SPS PDSCHs to overlap in a time domain in one slot. If the UE has the capability to receive multiple time-division PDSCHs in the slot, then the UE receives these SPS PDSCHs and feeds back the corresponding HARQ-ACKs. If the cycles of these SPSs are different, when the SPS PDSCHs overlap one another in a time domain within the slot, the UE receives the SPS PDSCH of the SPS with the lowest index and feeds back a corresponding HARQ-ACK only for the SPS PDSCH of the SPS with the lowest index.

Exemplary Embodiment 8

In the related art, in an application scenario of the 5th Generation Mobile Communication Technology (5G), in order to ensure coverage and transmit a service with low delay and high reliability in a short transmission time, dynamic scheduling-based aggregated transmission (Transport Block Aggregation for Uplink Transmission) and scheduling-free repetition (Transport Block Repetition for Uplink Transmission with a Configured Grant) are introduced. Release 15 standard stipulates that the repetition of a PUSCH or a Transport Block (TB) is slot-based repetition, that is, the PUSCH or TB are repeatedly transmitted by using multiple time slots, the PUSCH or TB is sent only once in each time slot, and the PUSCH or TB has the same time domain resource allocation on each time slot. This transmission type is referred as to PUSCH repetition Type A.

In order to optimize the service transmission performance of ultra-high reliability and ultra-low delay transmission, the repetition of the PUSCH or TB in the related art needs to be enhanced, that is, the same PUSCH or TB is repeatedly sent once or more times in the same time slot, or the same PUSCH or TB is repeatedly sent across time slot boundaries in multiple continuous time slots. This transmission type is referred as to PUSCH repetition Type B.

In 5G, a terminal capability supporting Half-duplex in Carrier Aggregation (Half-duplex in CA) is introduced in a Time-Division Duplex (TDD) mode. That is to say, a terminal cannot receive downlink information and send uplink information on the same time symbol on different carriers at the same time. The symbols mentioned below all refer to time symbols in the time domain.

Then, when the terminal supports the capability of Half-duplex in CA, when the terminal sends uplink information on one or more symbols on one Component Carrier (CC) or one cell, and when the terminal receives the downlink information/data on the same one or more symbols on another CC or cell, how to process the uplink information/data needs to be further specified.

In the present exemplary embodiment, when the base station configures multiple carriers for a terminal and enables Half-duplex in CA function (notified by setting half duplex behavior-r16='enable' in Radio Resource Control (RRC) signaling) and does not configure a PDCCH transmission opportunity for detecting a Dynamic Subframe Format (DCI format 2_0), the terminal cannot simultaneously receive the downlink information and send the uplink information on the same time symbol of multiple CCs or multiple cells. Moreover, the terminal reports the capability of supporting Half-duplex in CA. In the configuration of multiple CCs or multiple cells, a Reference cell refers to the cell with the lowest cell index identifier (ID) of all CCs or cells. Other cells refer to the cells other than the reference cell of all CCs or cells.

When the terminal is configured to receive downlink information on one or more symbols of a first cell, and is configured to send uplink information on the corresponding one or more symbols of a second cell, how to specify the terminal behavior configured for uplink transmission in the second cell is provided in the following method.

The downlink transmission/downlink information may be a PDCCH, a PDSCH, or a Channel-State Information Reference Signal (CSI-RS). The downlink transmission/downlink information may also be the information of Synchronization Signal/Physical Broadcast Channel Blocks (SS/PBCH Blocks) (SSBs) configured by ssb-PositionsInBurst signaling in high-level signaling SystemInformationBlockType1 or ssb-PositionsInBurst signaling in high-level signaling ServingCellConfigCommon.

The uplink transmission/uplink information may be a Sounding Reference Signal (SRS), a PUCCH, or a Physical Random-Access Channel (PRACH), or a PUSCH.

Exemplary implementations in the present exemplary embodiment are described below.

Exemplary Implementation 1

In the present exemplary implementation, the one or more symbols are symbols on which transmission cannot be performed. The symbols on which transmission cannot be performed may be at least one of the following:

one or more D symbols or F symbols of the first cell which are configured by the Semi Persistent subframe format; a symbol for transmitting a dynamic scheduling-based downlink transmission of the first cell, or a symbol for transmitting high-level signaling configured and semi persistent scheduling based downlink transmission of the first cell, or a symbol for transmitting Synchronization Signal/PBCH blocks (SS/PBCH blocks) configured by ssb-PositionsInBurst signaling in high-level signaling SystemInformationBlockType1 or ssb-PositionsInBurst signaling in high-level signaling ServingCellConfigCommon;

one or more U symbols or F symbols configured by the Semi Persistent subframe format, on the same time domain location of the first cell, of the second cell; a symbol for transmitting the dynamic scheduling-based uplink transmission of the second cell, or a symbol for transmitting high-level signaling configured and semi persistent scheduling based uplink transmission of the second cell.

The D symbols or F symbols configured by the Semi Persistent subframe format refer to Downlink symbols (D symbols) semi-persistently configured by high-level signaling TDD-UL-DL-ConfigurationCommon or TDD-UL-DL-ConfigDedicated.

The U symbols configured by the Semi Persistent subframe format refer to Uplink symbols (U symbols) semi-persistently configured by high-level TDD-UL-DL-ConfigurationCommon or TDD-UL-DL-ConfigDedicated.

The information carried by the uplink transmission cannot be transmitted on the symbols on which transmission cannot be performed.

Figure 8:
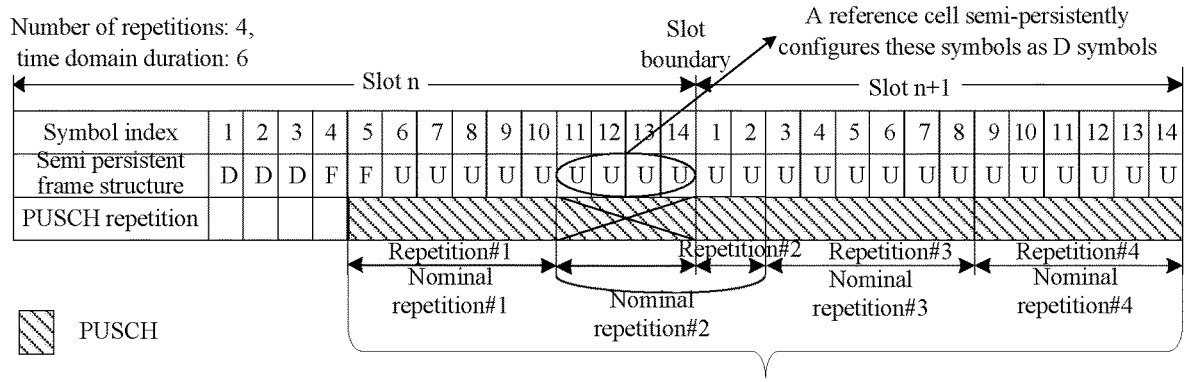
FIG. 8 is a schematic diagram (1) of the transmission of a PUSCH provided according to the embodiments of the present disclosure.

When the uplink transmission encounters the symbols on which transmission cannot be performed, the uplink transmission needs to be segmented. When the uplink transmission is a PUSCH, a nominal transmission of the PUSCH is segmented into one or more actual transmissions. FIG. 8 is a schematic diagram (1) of the transmission of the PUSCH provided according to the exemplary embodiment of the present disclosure. The abovementioned process of segmenting the nominal transmission of the PUSCH into one or more actual transmissions is as shown in FIG. 8.

The terminal regards the uplink symbol U of the second cell as a flexible symbol.

The uplink transmission may be PUSCH repetition Type A, or may also be PUSCH repetition Type B. The PUSCH repetition Type A or the PUSCH repetition Type B may be dynamic scheduling-based aggregation transmission, or may also be scheduling-free repetition Type1 or scheduling-free repetition Type2.

The first cell and the second cell may be configured on different frequency bands, or may also be configured on a frequency band.

Exemplary Implementation 2

In the present exemplary implementation, the one or more symbols cannot be used to transmit uplink information. The symbols that cannot be used to transmit the uplink information may be at least one of the following:

one or more D symbols or F symbols of the first cell which are configured by the Semi Persistent subframe format; a symbol for transmitting a dynamic scheduling-based downlink transmission of the first cell, or a symbol for transmitting high-level signaling configured and semi persistent scheduling based downlink transmission of the first cell, or a symbol for transmitting Synchronization Signal/PBCH blocks (SS/PBCH blocks) configured by ssb-PositionsInBurst signaling in high-level signaling SystemInformationBlockType1 or ssb-PositionsInBurst signaling in high-level signaling ServingCellConfigCommon;

one or more U symbols or F symbols configured by the Semi Persistent subframe format, on the same time domain location of the first cell, of the second cell; a symbol for transmitting the dynamic scheduling-based uplink transmission of the second cell, or a symbol for transmitting high-level signaling configured and semi persistent scheduling based uplink transmission of the second cell.

The D symbols or F symbols configured by the Semi Persistent subframe format refer to Downlink symbols (D symbols) semi-persistently configured by high-level signaling TDD-UL-DL-ConfigurationCommon or TDD-UL-DL-ConfigDedicated.

The U symbols configured by the Semi Persistent subframe format refer to Uplink symbols (U symbols) semi-persistently configured by high-level TDD-UL-DL-ConfigurationCommon or TDD-UL-DL-ConfigDedicated.

When the uplink transmission encounters the symbols that cannot be used to transmit the uplink information, the uplink transmission needs to be canceled.

Figure 9:
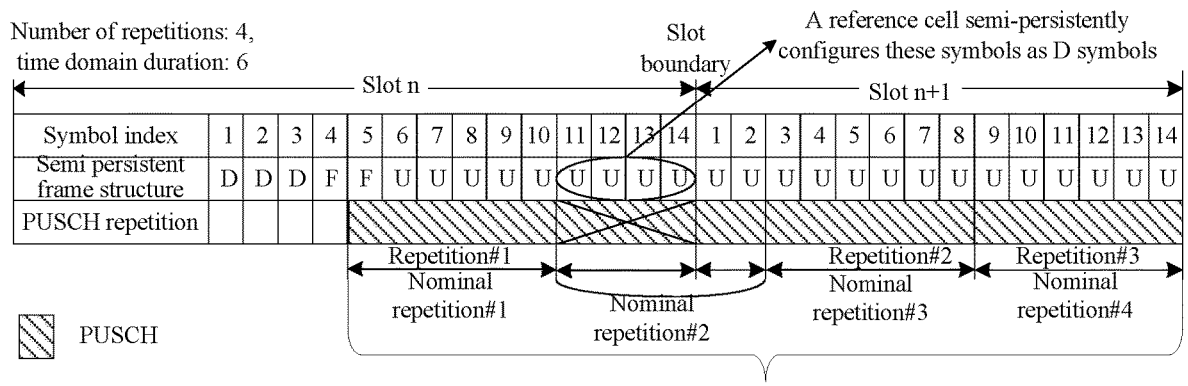
FIG. 9 is a schematic diagram (2) of the transmission of a PUSCH provided according to the embodiments of the present disclosure.

When not all symbols on the time domain resources of the uplink transmission encounter the symbols that cannot be used to transmit the uplink information, the uplink transmission on the symbols without collision (the uplink transmission not on the symbols that cannot be used to transmit the uplink information) also needs to be canceled. FIG. 9 is a schematic diagram (2) of the transmission of a PUSCH provided according to the embodiments of the present disclosure. The abovementioned transmission process is as shown in FIG. 9.

When all symbols on the time domain resources of the uplink transmission are the symbols that cannot be used to transmit the uplink information, the uplink transmission is canceled. When part of the symbols on the time domain resources of the uplink transmission are the symbols that cannot be used to transmit the uplink information, then the uplink transmission corresponding the part of the symbols is canceled, and the uplink transmission on the symbols without collision (the uplink transmission not on the symbols that cannot be used to transmit the uplink information) can be performed.

The terminal regards the uplink symbol U of the second cell as a flexible symbol.

The uplink transmission may be PUSCH repetition Type A, or may also be PUSCH repetition Type B. The PUSCH repetition Type A or the PUSCH repetition Type B may be dynamic scheduling-based aggregation transmission, or may also be scheduling-free repetition Type1 or scheduling-free repetition Type2.

The first cell and the second cell may be configured on different frequency bands, or may also be configured on a frequency band.

Exemplary Implementation 3

In the present exemplary implementation, the terminal does not expect collision on one or more symbols. The one or more symbols may be at least one of the following:

one or more D symbols or F symbols of the first cell which are configured by the Semi Persistent subframe format; a symbol for transmitting a dynamic scheduling-based downlink transmission of the first cell, or a symbol for transmitting high-level signaling configured and semi persistent scheduling based downlink transmission of the first cell, or a symbol for transmitting Synchronization Signal/PBCH blocks (SS/PBCH blocks) configured by ssb-PositionsInBurst signaling in high-level signaling SystemInformationBlockType1 or ssb-PositionsInBurst signaling in high-level signaling ServingCellConfigCommon;

one or more U symbols or F symbols configured by the Semi Persistent subframe format, on the same time domain location of the first cell, of the second cell;

a symbol for transmitting the dynamic scheduling-based uplink transmission of the second cell, or a symbol for transmitting high-level signaling configured and semi persistent scheduling based uplink transmission of the second cell.

The uplink transmission may be PUSCH repetition Type A, or may also be PUSCH repetition Type B. The PUSCH repetition Type A or the PUSCH repetition Type B may be dynamic scheduling-based aggregation transmission, or may also be scheduling-free repetition Type1 or scheduling-free repetition Type2.

The first cell and the second cell may be configured on different frequency bands, or may also be configured on a frequency band.

In the present exemplary embodiment, dynamic scheduling transmission refers to the transmission mode in which scheduling information is issued by Downlink Control Information (DCI) in physical layer signaling; semi persistent scheduling transmission type1 refers to the transmission mode in which scheduling information is issued by high level signaling RRC; semi persistent scheduling transmission type2 refers to a transmission mode in which scheduling information can be issued by active DCI. The repetition number or aggregation number of the repetition or aggregation of the abovementioned PUSCH may be an integer greater than or equal to 1.

In the present exemplary embodiment, the first cell and the second cell may be any one of the following: a reference cell, other cells, one cell in one or more cells, or only one cell (single carrier).

Embodiment 6

The present embodiment provides an HARQ-ACK codebook generation apparatus, which is applied to a UE. The apparatus is configured to implement the abovementioned embodiments and exemplary implementations, and those that have been described will not be elaborated. As used below, the term "module" may implement a combination of software and/or hardware of a predetermined function. Although the apparatus described in the following embodiments is implemented in software, the implementation in hardware or a combination of software and hardware, is also possible and contemplated.

Figure 10:
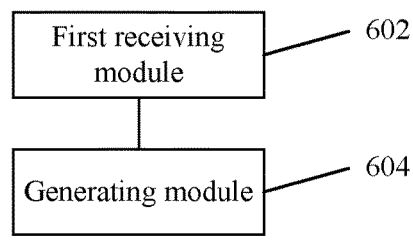
FIG. 10 is a structural block diagram (1) of an HARQ-ACK codebook generation apparatus provided according to the embodiments of the present disclosure.

FIG. 10 is a structural block diagram (1) of an HARQ-ACK codebook generation apparatus provided according to the embodiments of the present disclosure. As shown in FIG. 10, the apparatus in the present embodiment includes a first receiving module 602, and a generating module 604.

The first receiving module 602 is configured to receive UL grant information sent by a base station. A PUSCH scheduled by the UL grant information is used for the UE to transmit an HARQ-ACK codebook. The generating module 604 is configured to determine, according to a value of a DAI in the UL grant information and a situation that the UE receives PDSCHs, a corresponding mechanism to generate the HARQ-ACK codebook.

The remaining exemplary embodiments and technical effects of the HARQ-ACK codebook generation apparatus provided in the present embodiment all correspond to the HARQ-ACK codebook generation method provided in Embodiment 1, and will not be elaborated herein.

In an exemplary embodiment, the generating module 604 may be configured to determine the corresponding mechanism, according to the value of the DAI in the UL grant information and the situation that the UE receives PDSCHs, to generate the HARQ-ACK codebook in the following manner.

In a case where the value of the DAI is a first value or a second value, and the UE only receives multiple SPS PDSCHs, the UE generates HARQ-ACKs only for the plurality of SPS PDSCHs and forms an HARQ-ACK codebook from the HARQ-ACKs according to an SPS codebook mechanism.

In an exemplary embodiment, the abovementioned first value is "0", and the abovementioned second value is "1".

Each of the abovementioned modules may be implemented by software or hardware. For the latter, it may be implemented by, but not limited to, the following manners that the above modules are all located in the same processor, or the abovementioned modules are located in different processors in any combination form respectively.

Embodiment 7

In the present embodiment, an HARQ-ACK codebook generation apparatus is provided, which is applied to a base station. The apparatus is configured to implement the abovementioned embodiments and exemplary implementations, and those have not been described will not be elaborated. As used below, the term "module" may implement a combination of software and/or hardware of a predetermined function. Although the apparatus described in the following embodiments is implemented in software, the implementation in hardware or a combination of software and hardware, is also possible and contemplated.

Figure 11:
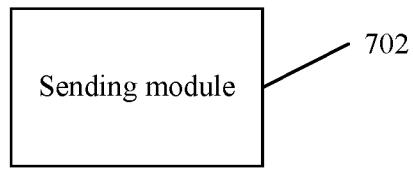
FIG. 11 is a structural block diagram (2) of an HARQ-ACK codebook generation apparatus provided according to the embodiments of the present disclosure.

FIG. 11 is a structural block diagram (2) of an HARQ-ACK codebook generation apparatus provided according to the embodiments of the present disclosure. As shown in FIG. 11, the apparatus in the present embodiment includes a sending module 702.

The sending module 702 is configured to send UL grant information to a UE, and determine a mechanism for the UE to generate the HARQ-ACK codebook by setting a value of a DAI in the UL grant information and indicating a situation of PDSCHs corresponding to HARQ-ACKs in the HARQ-ACK codebook. A PUSCH scheduled by the UL grant information is used for the UE to transmit the HARQ-ACK codebook.

The remaining exemplary embodiments and technical effects of the HARQ-ACK codebook generation apparatus provided in the present embodiment all correspond to the HARQ-ACK codebook generation method provided in Embodiment 2, and will not be elaborated herein.

In an exemplary embodiment, the sending module 702 may be configured to determine, by setting the value of the DAI in the UL grant information and indicating the situation of the PDSCHs corresponding to the HARQ-ACKs in the HARQ-ACK codebook, the mechanism for the UE to generate the HARQ-ACK codebook in the following manner.

In a case where the value of the DAI is a first value or a second value and it is indicated that the PDSCHs corresponding to the HARQ-ACKs in the HARQ-ACK codebook are only multiple SPS PDSCHs, it is determined that the mechanism for the UE to generate the HARQ-ACK codebook is an SPS codebook mechanism.

In an exemplary embodiment, the abovementioned first value is "0", and the abovementioned second value is "1".

Each of the abovementioned modules may be implemented by software or hardware. For the latter, it may be implemented by, but not limited to, the following manners that the above modules are all located in the same processor, or the abovementioned modules are located in different processors in any combination form respectively.

Embodiment 8

The present embodiment provides an HARQ-ACK codebook transmission apparatus, which is applied to a UE. The apparatus is configured to implement the abovementioned embodiments and exemplary implementations, and those that have been described will not be elaborated. As used below, the term "module" may implement a combination of software and/or hardware of a predetermined function. Although the apparatus described in the following embodiments is implemented in software, the implementation in hardware or a combination of software and hardware, is also possible and contemplated.

Figure 12:
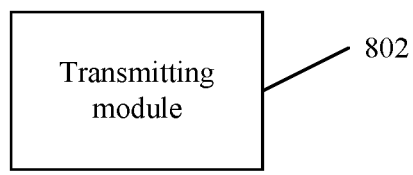
FIG. 12 is a structural block diagram of an HARQ-ACK codebook transmission apparatus provided according to the embodiments of the present disclosure.

FIG. 12 is a structural block diagram of an HARQ-ACK codebook transmission apparatus provided according to the embodiments of the present disclosure. As shown in FIG. 12, the apparatus in the present embodiment includes a transmitting module 802.

The transmitting module 802 is configured to transmit a first PUCCH and/or a second PUCCH in a same slot according to a preset mode. The first PUCCH is a PUCCH corresponding to a first HARQ-ACK codebook, the second PUCCH is a PUCCH corresponding to a second HARQ-ACK codebook, and the first PUCCH and the second PUCCH do not overlap in a time domain.

The remaining exemplary embodiments and technical effects in the present embodiment all correspond to the HARQ-ACK codebook transmission apparatus provided in Embodiment 3, and will not be elaborated herein.

In an exemplary embodiment, the abovementioned operation that the first PUCCH and/or the second PUCCH are transmitted in the same slot according to the preset mode includes the following operation.

The first PUCCH and/or the second PUCCH are transmitted in the same slot according a priority between the first HARQ-ACK codebook and the second HARQ-ACK codebook. The priority of the first HARQ-ACK codebook is higher than the priority of the second HARQ-ACK codebook.

In an exemplary embodiment, the operation that the first PUCCH and/or the second PUCCH are transmitted in the same slot according the priorities of the first HARQ-ACK codebook and the second HARQ-ACK codebook includes the following operations.

In a case where the UE is configured to transmit the second PUCCH in an Nth slot, and the UE receives a request to transmit, in the Nth slot, the first PUCCH, the UE transmits the first PUCCH and the second PUCCH in the Nth slot; or in a case where the UE is configured to transmit the second PUCCH in an Nth slot, and the UE receives a request to transmit, in the Nth slot, the first PUCCH, the UE transmits the first PUCCH and discards the second PUCCH in the Nth slot.

Each of the abovementioned modules may be implemented by software or hardware. For the latter, it may be implemented by, but not limited to, the following manners that the above modules are all located in the same processor, or the abovementioned modules are located in different processors in any combination form respectively.

Embodiment 9

The present embodiment provides a PDSCH reception apparatus, which is applied to a UE. The apparatus is configured to implement the abovementioned embodiments and exemplary implementations, and those that have been described will not be elaborated. As used below, the term "module" may implement a combination of software and/or hardware of a predetermined function. Although the apparatus described in the following embodiments is implemented in software, the implementation in hardware or a combination of software and hardware, is also possible and contemplated.

Figure 13:
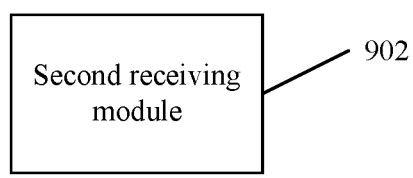
FIG. 13 is a structural block diagram (1) of a PDSCH reception apparatus provided according to the embodiments of the present disclosure.

FIG. 13 is a structural block diagram (1) of a PDSCH reception apparatus provided according to the embodiments of the present disclosure. As shown in FIG. 13, the apparatus in the present embodiment includes a second receiving module 902.

The second receiving module 902 is configured to, in a case where at least one DS PDSCH scheduled by a base station and at least one SPS PDSCH configured by the base station overlap in a time domain, at least discard at least one first SPS PDSCH, and receive at least one target SPS PDSCH and the at least one DS PDSCH. The at least one first SPS PDSCH is one or more SPS PDSCHs, that overlap the at least one DS PDSCH in the time domain, in the at least one SPS PDSCH.

The remaining exemplary embodiments and technical effects in the present embodiment all correspond to the PDSCH reception apparatus provided in Embodiment 4, and will not be elaborated herein.

In an exemplary embodiment, the abovementioned operation that at least one target SPS PDSCH is received includes the following operations.

The at least one target SPS PDSCH is determined in at least one second SPS PDSCH according to an SPS index, and the at least one target SPS PDSCH is received. The at least one second SPS PDSCH is one or more SPS PDSCHs, other than the at least one first SPS PDSCH, in the at least one SPS PDSCH.

In an exemplary embodiment, the abovementioned operation that the at least one target SPS PDSCH is determined in the at least one second SPS PDSCH according to the SPS index includes the following operation.

An SPS PDSCH with a lowest SPS index in the at least one second SPS PDSCH is determined as the target SPS PDSCH.

In an exemplary embodiment, the abovementioned operation that the at least one target SPS PDSCH is determined in the at least one second SPS PDSCH according to the SPS index includes the following operations.

An SPS PDSCH set is established according to the at least one second SPS PDSCH, an SPS PDSCH with a lowest SPS index in the established SPS PDSCH set is determined as the target SPS PDSCH, at least one SPS PDSCH, that overlaps the target SPS PDSCH in the time domain, in the established SPS PDSCH set is determined as at least one SPS PDSCH to be discarded, and the at least one SPS PDSCH to be discarded is discarded. An SPS PDSCH set is re-established according to at least one SPS PDSCH, other than the target SPS PDSCH and the at least one SPS PDSCH to be discarded, in the established SPS PDSCH set, and following operations are repeated until each SPS PDSCH of the at least one second SPS PDSCH is determined as either the target SPS PDSCH or the SPS PDSCH to be discarded:

an SPS PDSCH with a lowest SPS index in the re-established SPS PDSCH set is determined as the target SPS PDSCH, at least one SPS PDSCH, that overlaps the target SPS PDSCH in the time domain, in the re-established SPS PDSCH set is determined as at least one SPS PDSCH to be discarded, and the at least one SPS PDSCH to be discarded is discarded; and an SPS PDSCH set is re-established according to at least one SPS PDSCH, other than the target SPS PDSCH and the at least one SPS PDSCH to be discarded, in the re-established SPS PDSCH set.

Each of the abovementioned modules may be implemented by software or hardware. For the latter, it may be implemented by, but not limited to, the following manners that the above modules are all located in the same processor, or the abovementioned modules are located in different processors in any combination form respectively.

Embodiment 10

The present embodiment provides a PDSCH reception apparatus, which is applied to a UE. The apparatus is configured to implement the abovementioned embodiments and exemplary implementations, and those that have been described will not be elaborated. As used below, the term "module" may implement a combination of software and/or hardware of a predetermined function. Although the apparatus described in the following embodiments is implemented in software, the implementation in hardware or a combination of software and hardware, is also possible and contemplated.

Figure 14:
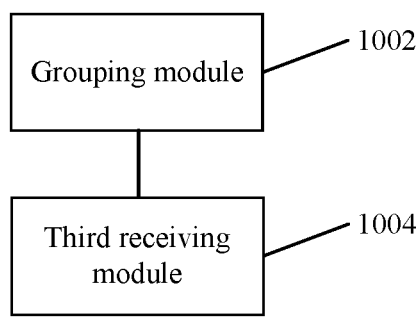
FIG. 14 is a structural block diagram (2) of a PDSCH reception apparatus provided according to the embodiments of the present disclosure.

FIG. 14 is a structural block diagram (2) of a PDSCH reception apparatus provided according to the embodiments of the present disclosure. As shown in FIG. 14, the apparatus in the present embodiment includes: a grouping module 1002 and a third receiving module 1004.

The grouping module 1002 is configured to group at least one DS PDSCH and at least one SPS PDSCH according to a preset priority, so as to obtain at least one PDSCH set. Each PDSCH set includes at least one DS PDSCH and/or at least one SPS PDSCH. The third receiving module 1004 is configured to determine, in each PDSCH set, a DS PDSCH to be received and/or an SPS PDSCH to be received in the PDSCH set according to a preset mode.

The remaining exemplary embodiments and technical effects in the present embodiment all correspond to the PDSCH reception apparatus provided in Embodiment 5, and will not be elaborated herein.

In an exemplary embodiment, the operation that the DS PDSCH to be received and/or the SPS PDSCH to be received in the PDSCH set is determined in each PDSCH set according to the preset mode includes the following operations.

In a case where the PDSCH set only includes at least one SPS PDSCH, an SPS PDSCH set is established according to the at least one SPS PDSCH, an SPS PDSCH with a lowest SPS index in the SPS PDSCH set is determined as a target SPS PDSCH, and at least one SPS PDSCH, that overlaps the target SPS PDSCH in a time domain, in the established SPS PDSCH set is determined as at least one SPS PDSCH to be discarded, and then discarded; an SPS PDSCH set is re-established according to at least one SPS PDSCH, other than the target SPS PDSCH and the at least one SPS PDSCH to be discarded, in the established SPS PDSCH set, and the following operations are repeated until each of the at least one SPS PDSCH is determined as either the target SPS PDSCH or the SPS PDSCH to be discarded:

an SPS PDSCH with a lowest SPS index in the re-established SPS PDSCH set is determined as a target SPS PDSCH, and at least one SPS PDSCH, that overlaps the target SPS PDSCH in the time domain, in the re-established SPS PDSCH set is determined as at least one SPS PDSCH to be discarded, and then discarded; an SPS PDSCH set is re-established according to at least one SPS PDSCH, other than the target SPS PDSCH and the at least one SPS PDSCH to be discarded, in the re-established SPS PDSCH set; and the target SPS PDSCH is determined as the SPS PDSCH to be received.

In an exemplary embodiment, the operation that the DS PDSCH to be received and/or the SPS PDSCH to be received in the PDSCH set is determined in each PDSCH set according to the preset mode includes the following operations.

In a case where at least one DS PDSCH and at least one SPS PDSCH are included in the PDSCH set, at least one first SPS PDSCH is discarded, and an SPS PDSCH with a lowest SPS index in at least one second SPS PDSCH is determined as a target SPS PDSCH; the target SPS PDSCH is determined as the SPS PDSCH to be received, and the at least one DS PDSCH in the PDSCH set is determined as the DS PDSCH to be received. The at least one first SPS PDSCH is one or more SPS PDSCHs, that overlap the at least one DS PDSCH in a time domain, in the at least one SPS PDSCH in the PDSCH set, and the at least one second SPS PDSCH is one or more SPS PDSCHs, other than the at least one first SPS PDSCH, in the at least one SPS PDSCH in the PDSCH set.

In an exemplary embodiment, the third receiving module 1004 is further configured to perform the following operations.

In a case where a first PDSCH set overlaps a second PDSCH set in a time domain, the second PDSCH set is discarded. Herein, the first PDSCH set and the second PDSCH set are any two PDSCH sets of a plurality of PDSCH sets, and a priority of the first PDSCH set is higher than a priority of the second PDSCH set.

Each of the abovementioned modules may be implemented by software or hardware. For the latter, it may be implemented by, but not limited to, the following manners that the above modules are all located in the same processor, or the abovementioned modules are located in different processors in any combination form respectively.

Embodiment 11

The embodiments of the disclosure further provide a computer readable storage medium. The computer readable storage medium stores a computer program. The computer program is configured to perform the operations in any one of the abovementioned method embodiments when being executed.

In an exemplary implementation of the present embodiment, the abovementioned computer readable storage medium may be configured to store a computer program for performing the abovementioned embodiments.

In an exemplary implementation of the present embodiment, the abovementioned computer readable storage medium may include, but is not limited to, various media capable of storing a computer program, such as a USB flash disk, a Read-Only Memory (ROM), a Random Access Memory (disk), a mobile hard disk, a magnetic disk or an optical disc.

Embodiment 12

The embodiments of the present disclosure further provide an electronic apparatus, including a memory and a processor. The memory stores a computer program, and the processor is configured to run the computer program to perform the operations in any one of the abovementioned method embodiments.

In an exemplary implementation of the present embodiment, the abovementioned electronic apparatus may further include a transmission device and an input/output device. The transmission device is connected to the abovementioned processor. The input/output device is connected to the abovementioned processor.

In an exemplary implementation of the present embodiment, the abovementioned processor may be configured to perform the operations in the abovementioned embodiments through a computer program.

Optionally, a specific example in the present embodiment may refer to the examples described in the above embodiments and exemplary implementations, and details are not described herein in the present embodiment.

Various modules or operations mentioned above in the embodiments of the present disclosure may be implemented by using a general calculation apparatus, may be centralized on a single calculation apparatus or may be distributed on a network composed of multiple calculation apparatuses. Optionally, they may be implemented by using executable program codes of the calculation apparatuses. Thus, they may be stored in a storage apparatus and executed by the calculation apparatuses, the shown or described operations may be executed in a sequence different from this sequence under certain conditions, or they are manufactured into each integrated circuit module respectively, or multiple modules or operations therein are manufactured into a single integrated circuit module. Therefore, the present disclosure is not limited to any specific hardware and software combination.

What is claimed is:

1. A Hybrid Automatic Repeat ReQuest Acknowledgement (HARQ-ACK) codebook generation method, applied to a User Equipment (UE) and comprising:

receiving Uplink (UL) grant information sent by a base station, wherein a Physical Uplink Shared Channel (PUSCH) scheduled by the UL grant information is used for the UE to transmit an HARQ-ACK codebook; and according to a value of a Downlink Assignment Index (DAI) in the UL grant information and a situation that the UE receives Physical Downlink Shared Channels (PDSCHs), determining a corresponding mechanism to generate the HARQ-ACK codebook, wherein the determining comprises: in a case where the value of the DAI is 0 or 1 and the UE only receives multiple Semi Persistent Scheduling (SPS) PDSCHs, generating HARQ-ACKs only for the multiple SPS PDSCHs and forming the HARQ-ACK codebook from the HARQ-ACKs based on an HARQ-ACK codebook mechanism for SPS PDSCHs.

2. A Hybrid Automatic Repeat ReQuest Acknowledgement HARQ-ACK) codebook generation, applied to a base station and comprising:

sending Uplink (UL) grant information to a User Equipment (UE), wherein a Physical Uplink Shared Channel (PUSCH) scheduled by the UL grant information is used for the UE to transmit an HARQ-ACK codebook; and determining a mechanism for generating the HARQ-ACK codebook based on a value of a Downlink Assignment Index (DAI) set in the UL grant information and a situation that the base station sends Physical Downlink Shared Channels (PDSCHs), wherein the determining comprises: in a case where the value of the DAI is 0 or 1 and the sent PDSCHs are only multiple SPS PDSCHs, determining, by the base station, that the UE generates HARQ-ACKs only for the multiple SPS PDSCHs and forms the HARQ-ACK codebook from the HARQ-ACKs based on an HARQ-ACK codebook mechanism for SPS PDSCHs.

3. A Hybrid Automatic Repeat ReQuest Acknowledgement (HARQ-ACK) codebook transmission method, applied to a User Equipment (UE) and comprising:

transmitting at least one of a first Physical Uplink Control Channel (PUCCH) corresponding to a first HARQ-ACK codebook and a second PUCCH corresponding to a second HARQ-ACK codebook in a same slot according to a priority between the first HARQ-ACK codebook and the second HARQ-ACK codebook, wherein the first PUCCH and the second PUCCH do not overlap in a time domain, and the priority of the first HARQ-ACK codebook is high priority and the priority of the second HARQ-ACK codebook is low priority, and wherein the transmitting comprises: in a case where the UE is required to transmit the second PUCCH in a slot n, and the UE is required to transmit, in the slot n, the first PUCCH, transmitting, by the UE, the first PUCCH and the second PUCCH in the slot n; or in a case where the UE is required to transmit the second PUCCH in a slot n, and the UE is required to transmit, in the slot n, the first PUCCH, transmitting, by the UE, the first PUCCH in the slot n, and discarding, by the UE, the second PUCCH in the slot n.

4. A non-transitory computer-readable storage medium, storing a computer program, wherein when the computer program is executed by a processor, the method of claim 1 is implemented.

5. An electronic apparatus, comprising: a memory and a processor, wherein the memory stores a computer program, and the processor is configured to run computer program to implement the method of claim 1.

6. A non-transitory computer-readable storage medium, storing a computer program, wherein when the computer program is executed by a processor, the method of claim 3 is implemented.

7. An electronic apparatus, comprising: a memory and a processor, wherein the memory stores a computer program, and the processor is configured to run computer program to implement the method of claim 3.

8. A Hybrid Automatic Repeat ReQuest Acknowledgement (HARQ-ACK) codebook transmission method, applied to a base station and comprising:

receiving at least one of a first Physical Uplink Control Channel (PUCCH) corresponding to a first HARQ-ACK codebook and a second PUCCH corresponding to a second HARQ-ACK codebook that is transmitted by a User Equipment (UE) in a same slot according to a priority between the first HARQ-ACK codebook and the second HARQ-ACK codebook, wherein the first PUCCH and the second PUCCH do not overlap in a time domain, and the priority of the first HARQ-ACK codebook is high priority and the priority of the second HARQ-ACK codebook is low priority, and wherein the receiving comprises: in a case where the UE is required to transmit the second PUCCH in a slot n, and the UE is required to transmit, in the slot n, the first PUCCH, receiving the first PUCCH and the second PUCCH that are transmitted by the UE in the slot n; or in a case where the UE is required to transmit the second PUCCH in a slot n, and the UE is required to transmit, in the slot n, the first PUCCH, receiving the first PUCCH that is transmitted by the UE in the slot n, wherein the second PUCCH in the slot n is discarded by the UE.

9. A non-transitory computer-readable storage medium, storing a computer program, wherein when the computer program is executed by a processor, the method of claim 2 is implemented.

10. An electronic apparatus, comprising: a memory and a processor, wherein the memory stores a computer program, and the processor is configured to run computer program to implement the method of claim 2.

11. A non-transitory computer-readable storage medium, storing a computer program, wherein when the computer program is executed by a processor, the method of claim 8 is implemented.

12. An electronic apparatus, comprising: a memory and a processor, wherein the memory stores a computer program, and the processor is configured to run computer program to implement the method of claim 8.

* * * * *